Jan. 13, 1942.  O. L. CLEVEN  2,269,894
TABULATING MACHINE
Filed July 28, 1939  20 Sheets-Sheet 3

INVENTOR
O. L. CLEVEN
By J. F. Mothershead
ATTORNEY

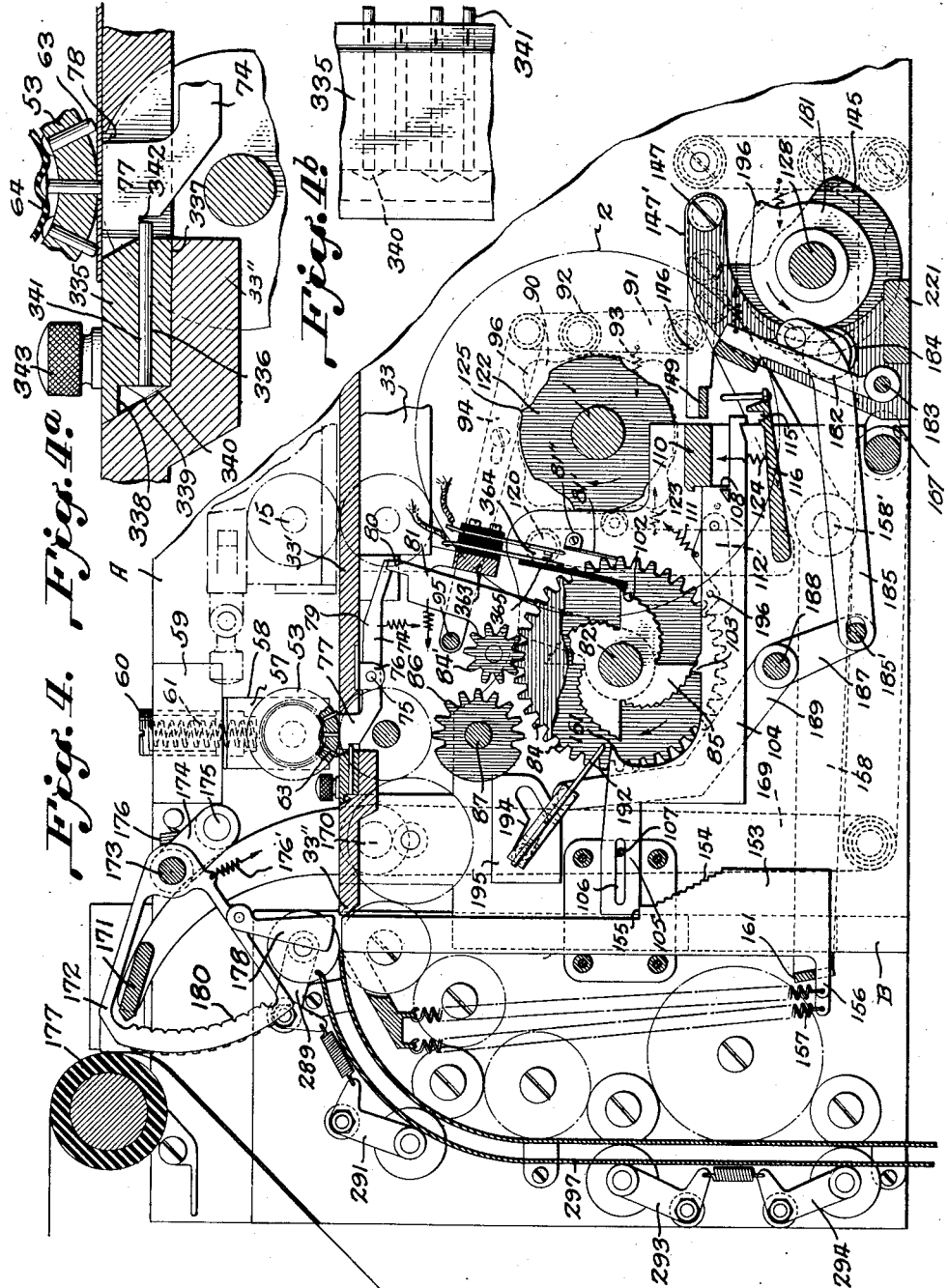

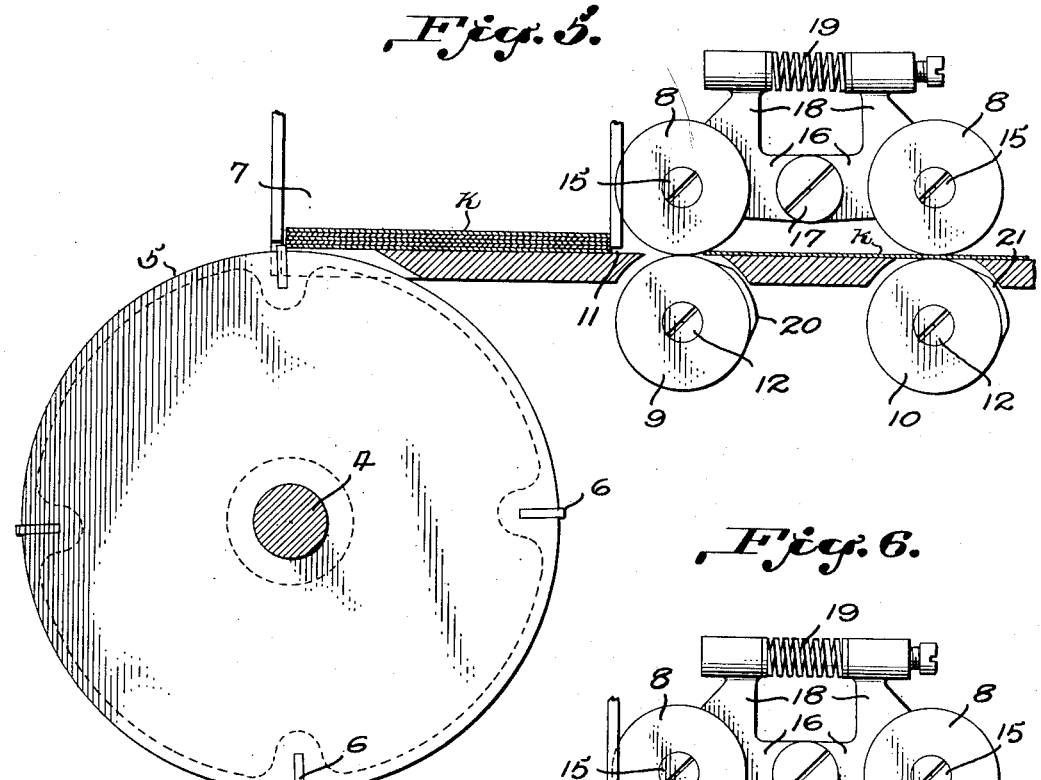
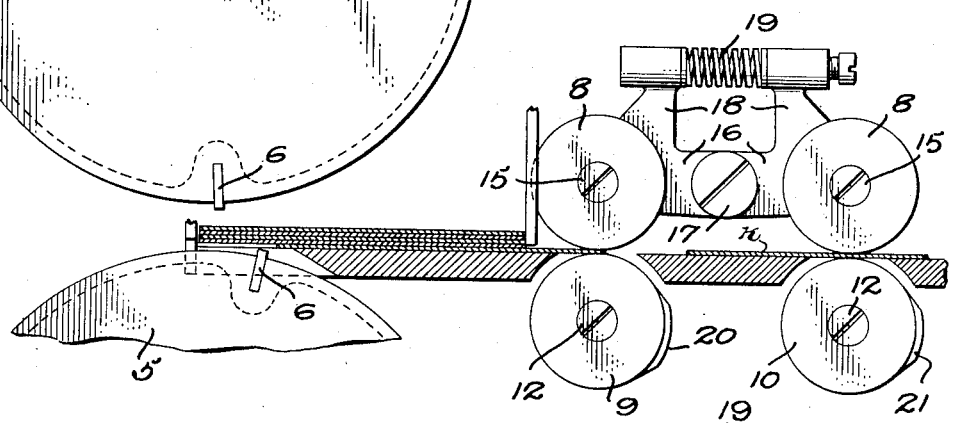
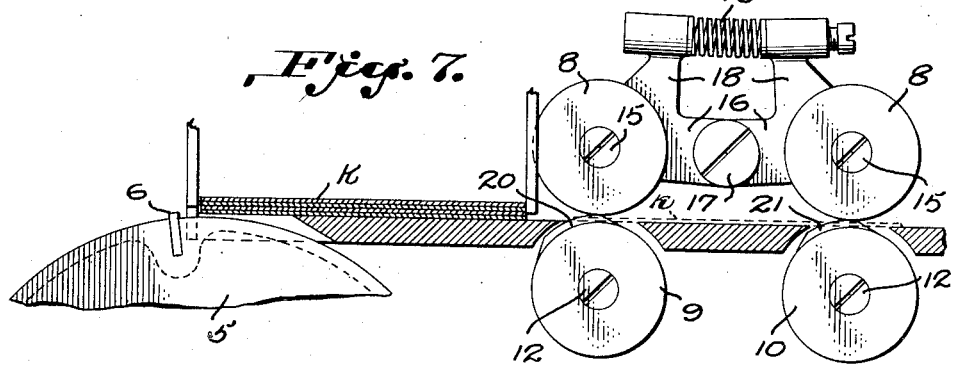

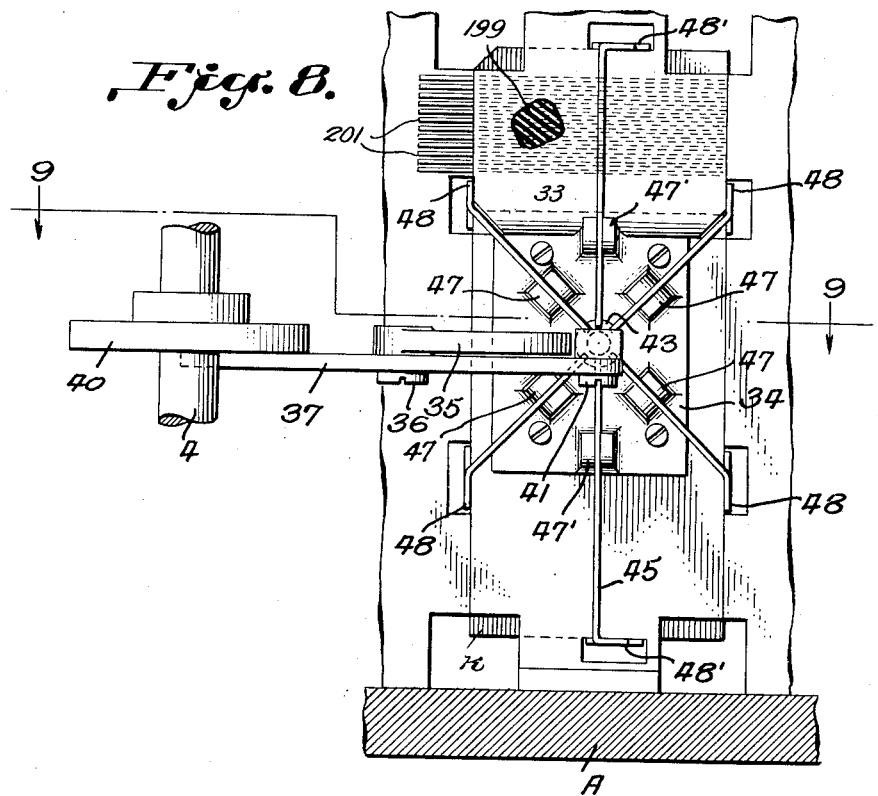
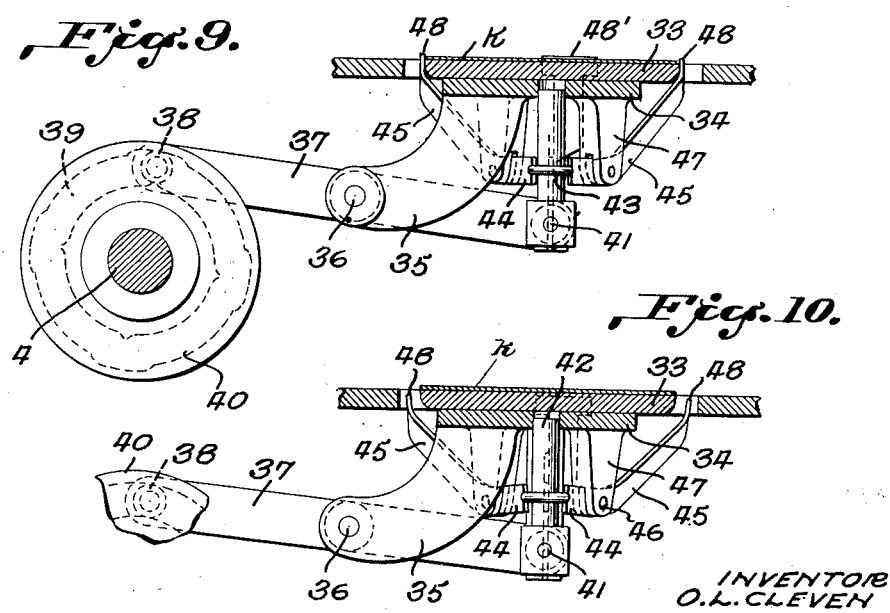

Jan. 13, 1942.　　O. L. CLEVEN　　2,269,894
TABULATING MACHINE
Filed July 28, 1939　　20 Sheets-Sheet 7
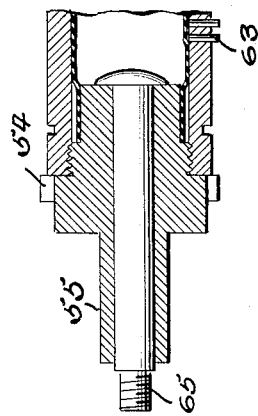
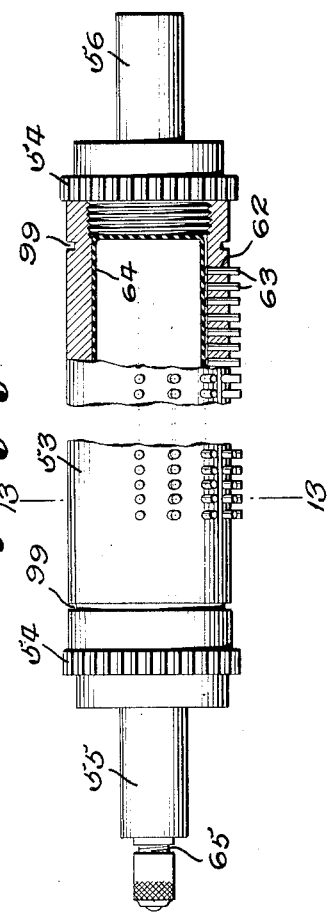
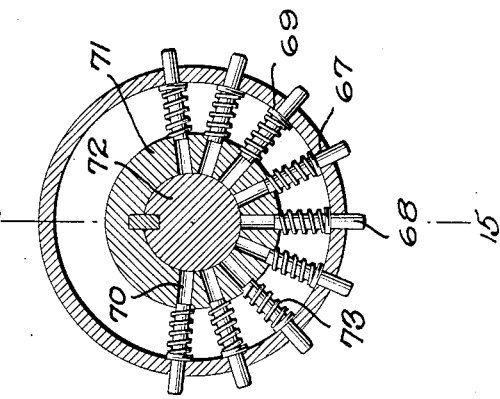
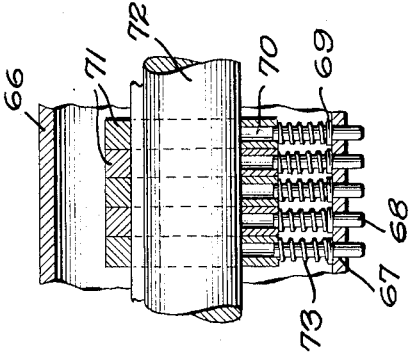
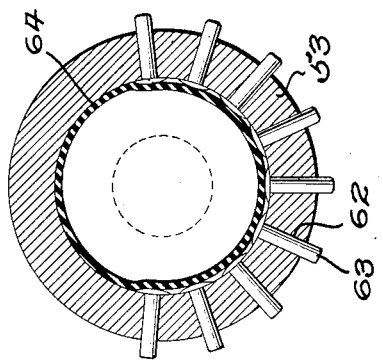
INVENTOR
O. L. CLEVEN
ATTORNEY Jan. 13, 1942.    O. L. CLEVEN    2,269,894
TABULATING MACHINE
Filed July 28, 1939    20 Sheets-Sheet 8

INVENTOR
O. L. CLEVEN
By J. Mothershead
ATTORNEY

Jan. 13, 1942.  O. L. CLEVEN  2,269,894
TABULATING MACHINE
Filed July 28, 1939  20 Sheets-Sheet 9
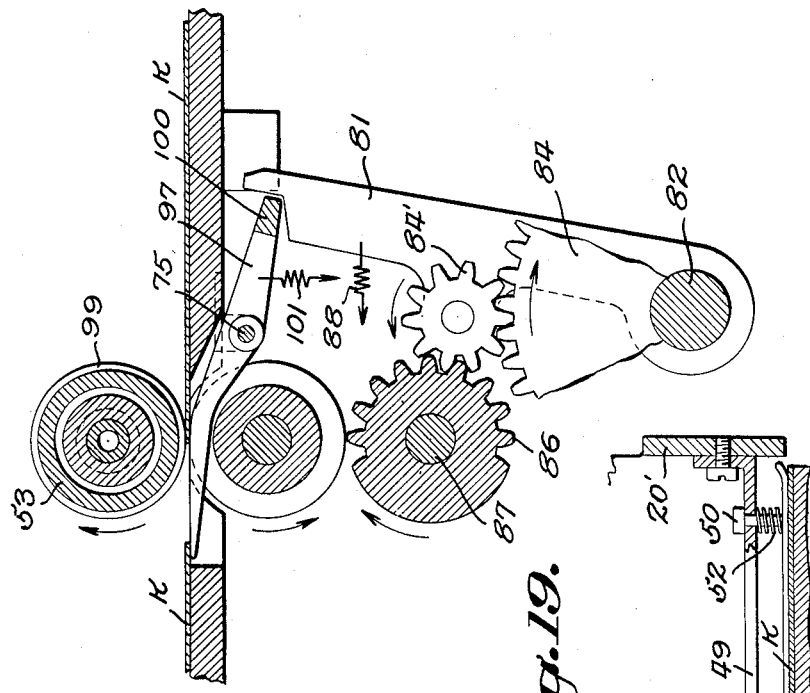
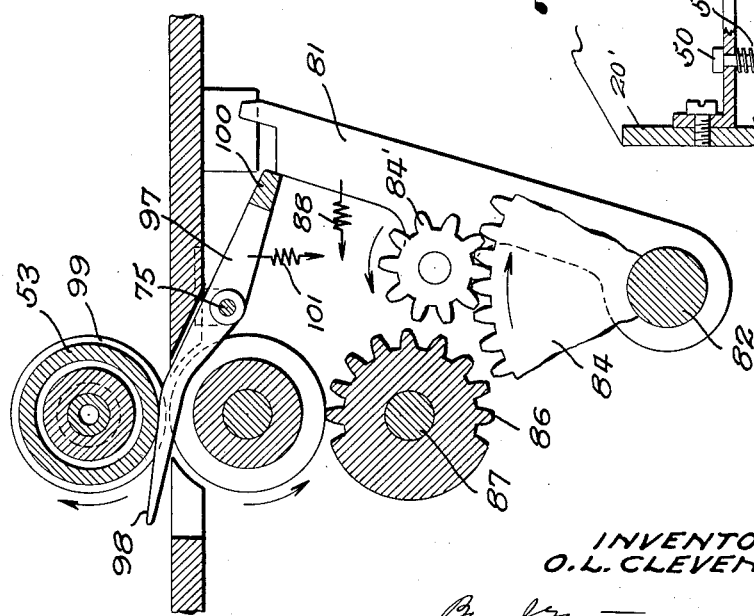
INVENTOR
O. L. CLEVEN
ATTORNEY Jan. 13, 1942.   O. L. CLEVEN   2,269,894
TABULATING MACHINE
Filed July 28, 1939   20 Sheets-Sheet 10
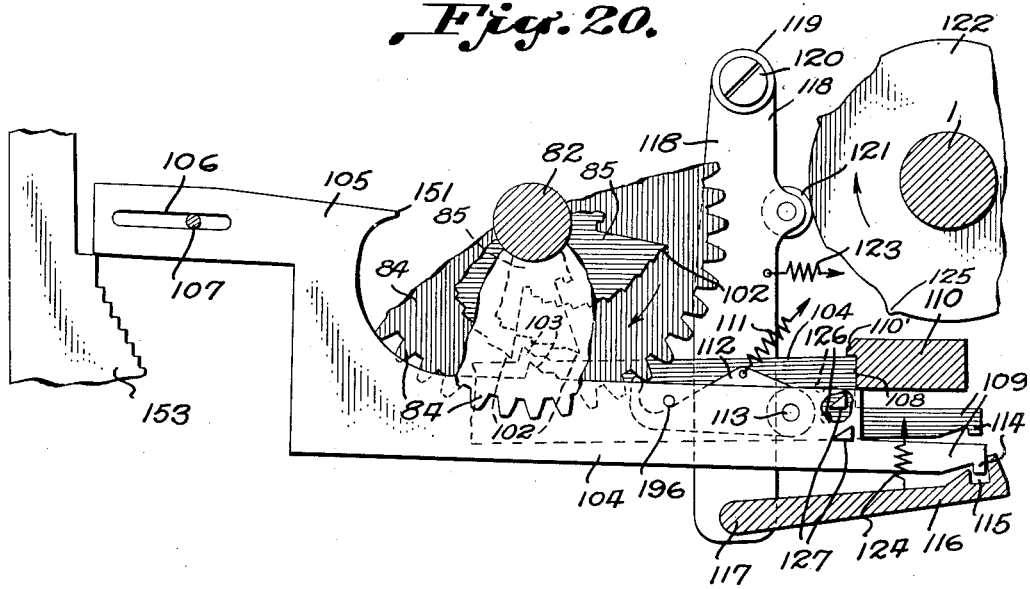
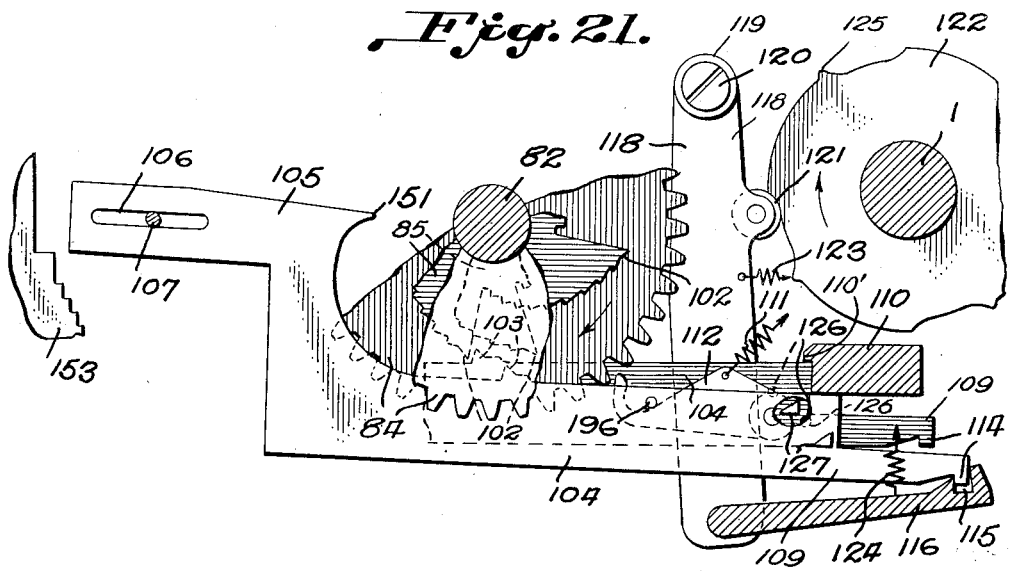
INVENTOR
O. L. CLEVEN
ATTORNEY

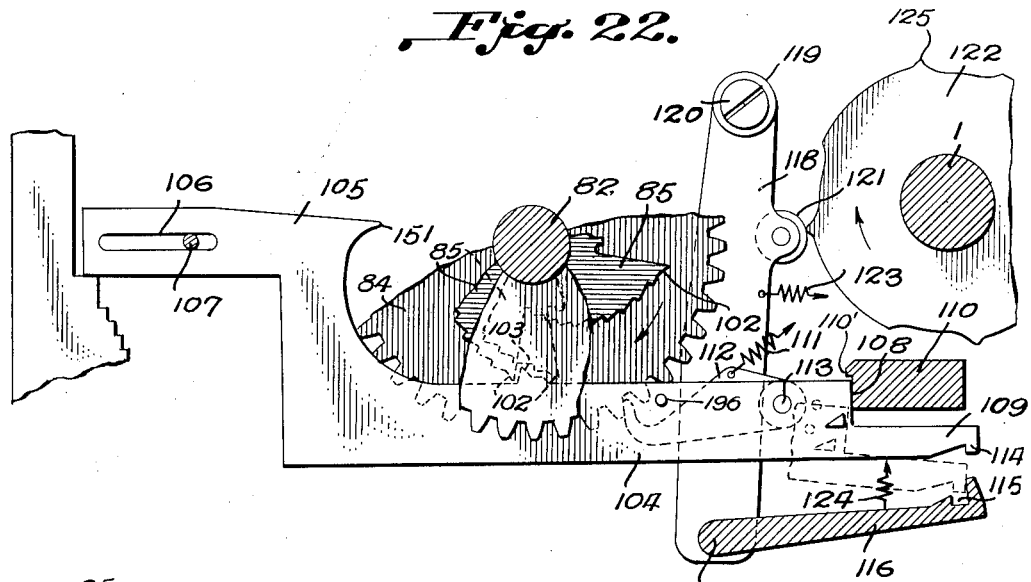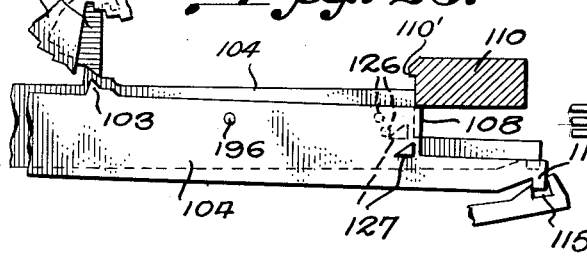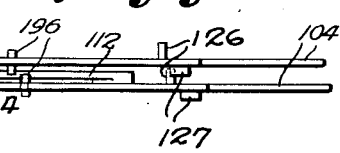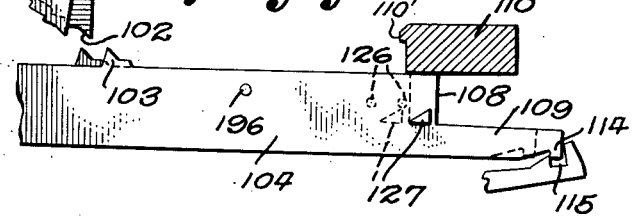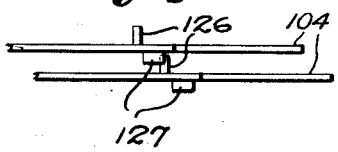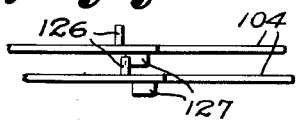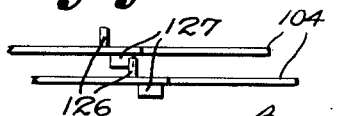

Jan. 13, 1942.     O. L. CLEVEN     2,269,894
TABULATING MACHINE
Filed July 28, 1939     20 Sheets-Sheet 12
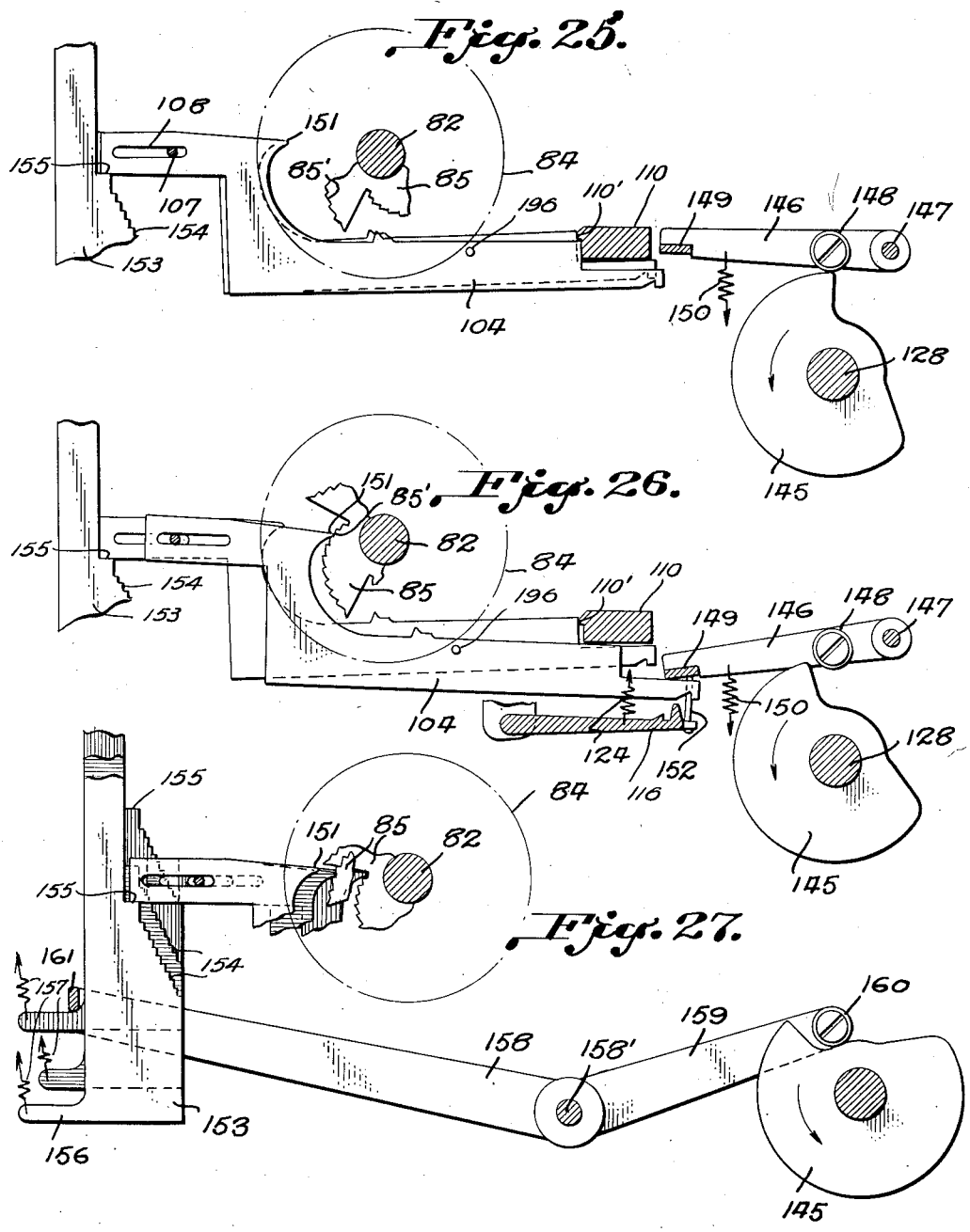
INVENTOR
O. L. CLEVEN
ATTORNEY Jan. 13, 1942.  O. L. CLEVEN  2,269,894
TABULATING MACHINE
Filed July 28, 1939  20 Sheets-Sheet 13
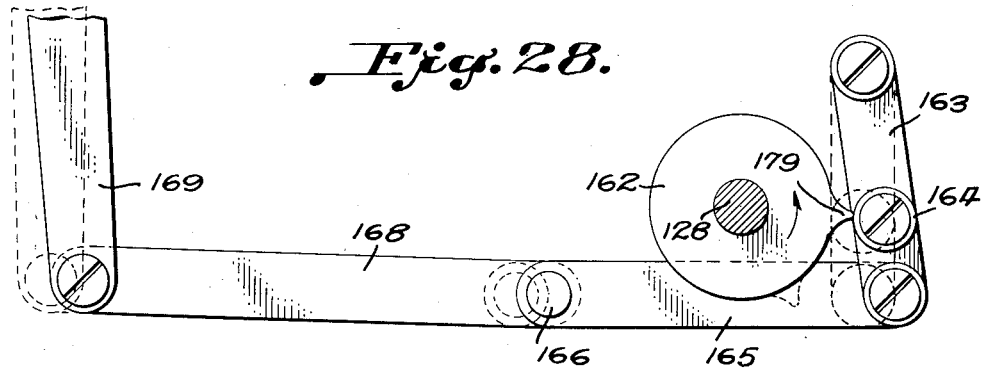
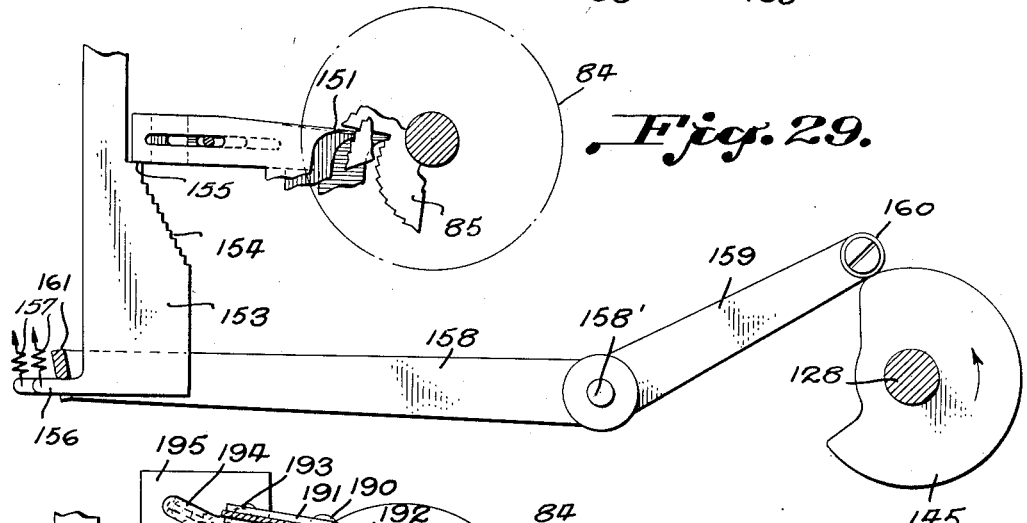
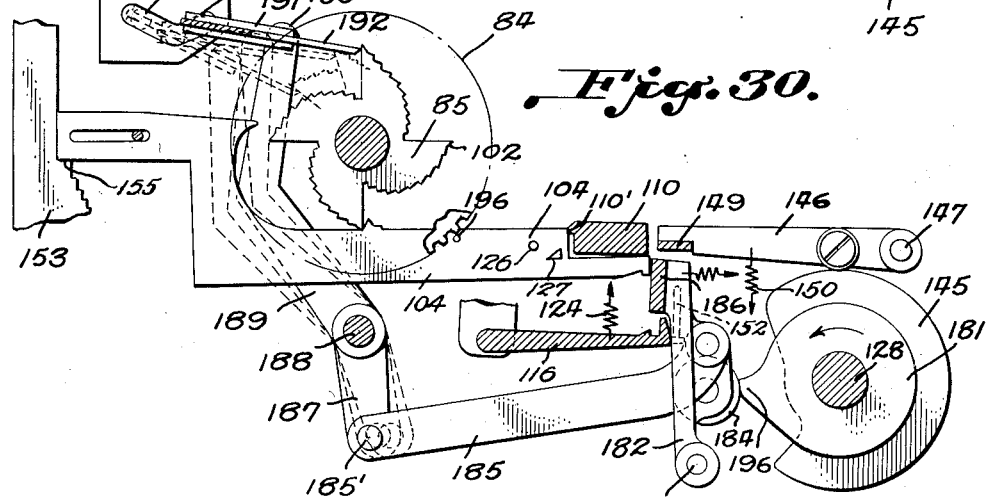
INVENTOR
O. L. CLEVEN
ATTORNEY

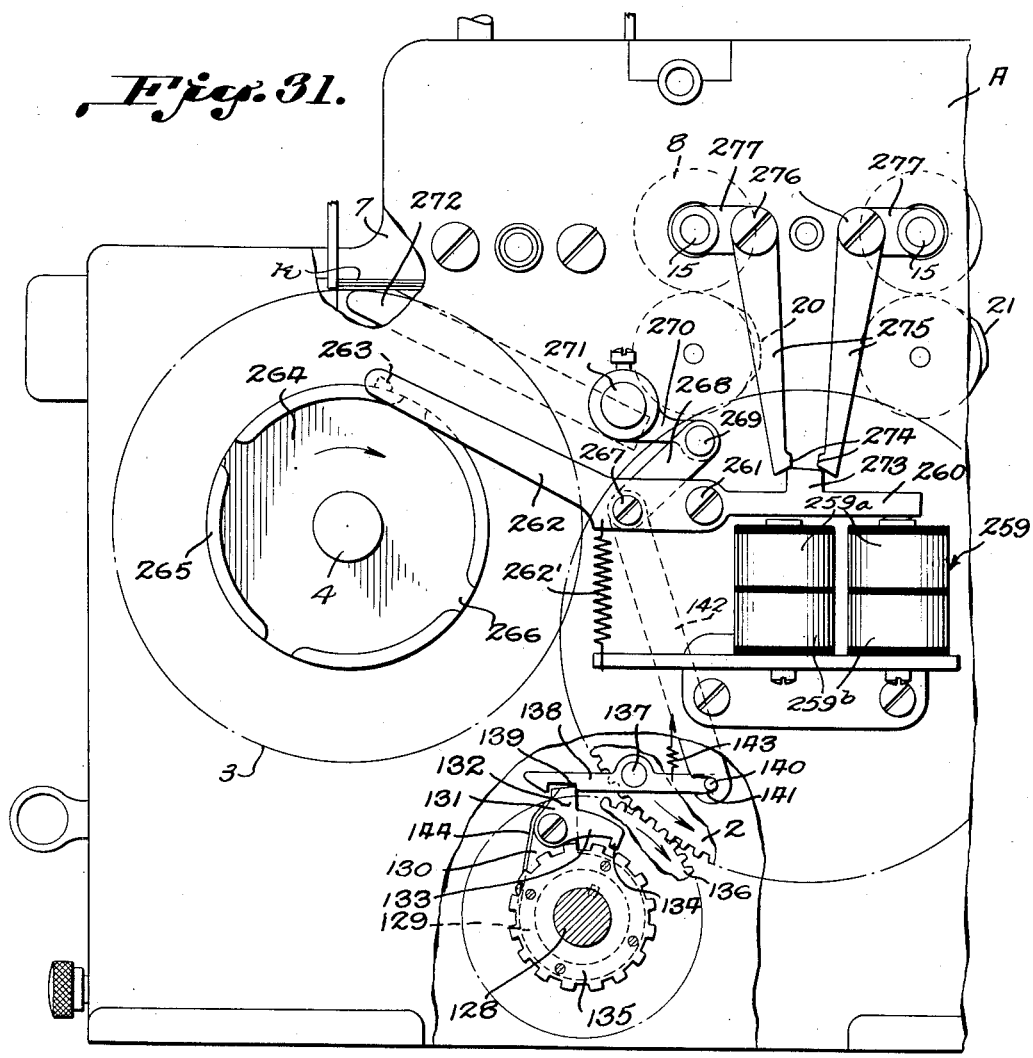
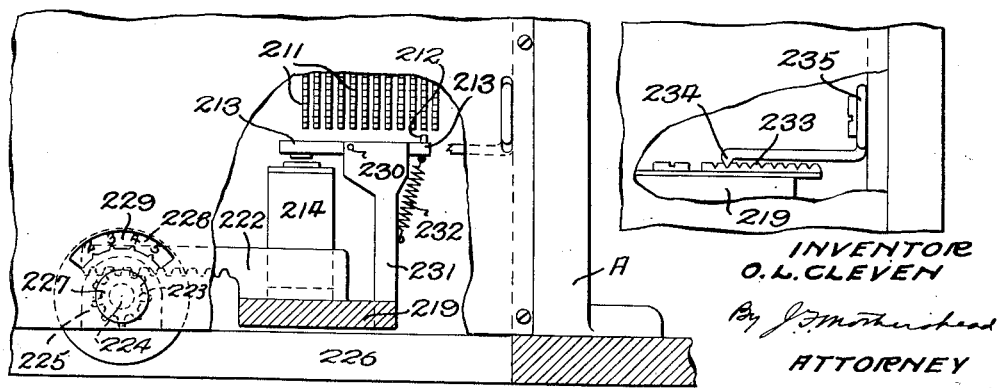

Jan. 13, 1942.     O. L. CLEVEN     2,269,894
TABULATING MACHINE
Filed July 28, 1939     20 Sheets-Sheet 15

*Fig. 34.*

INVENTOR
O. L. CLEVEN
ATTORNEY

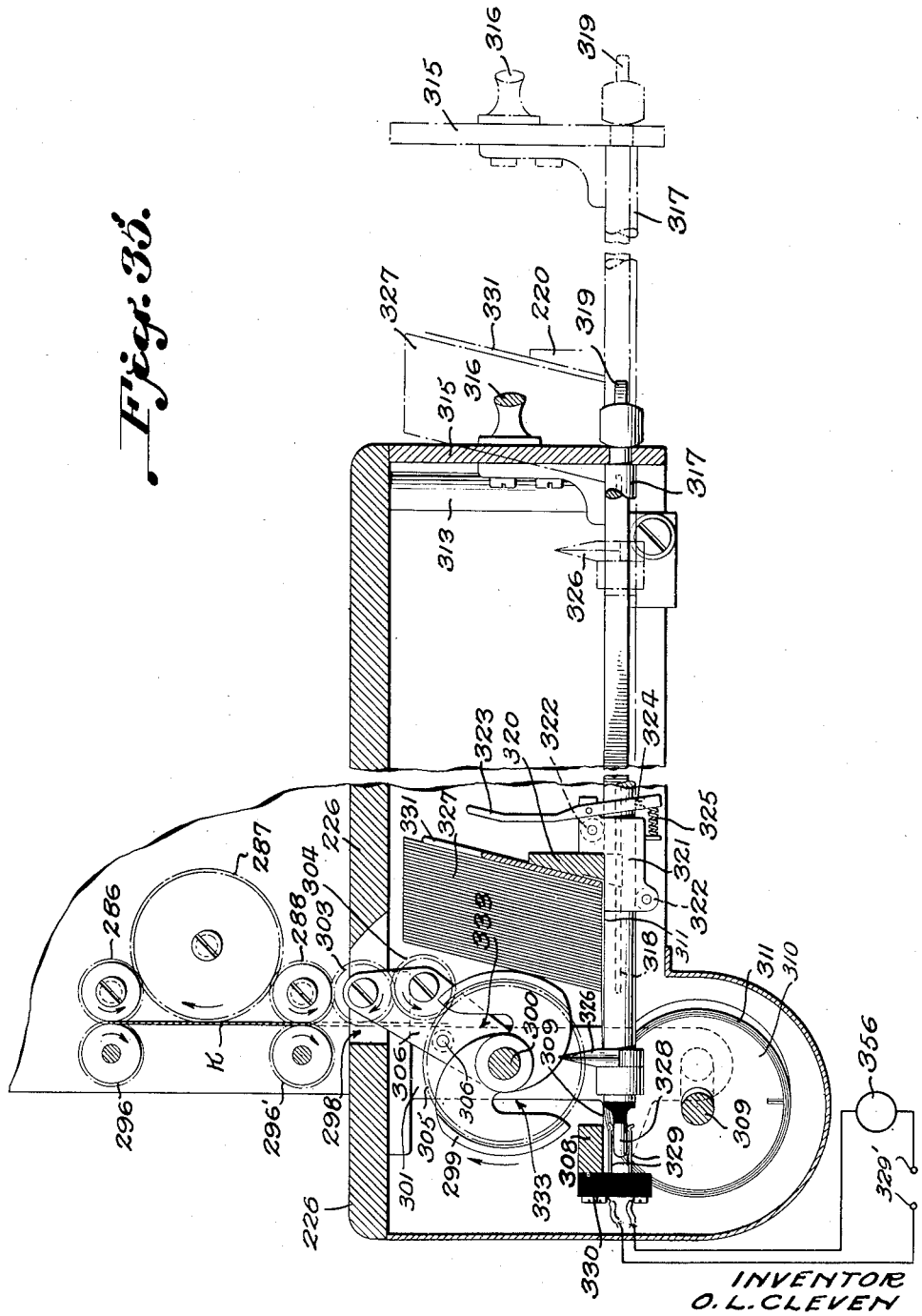

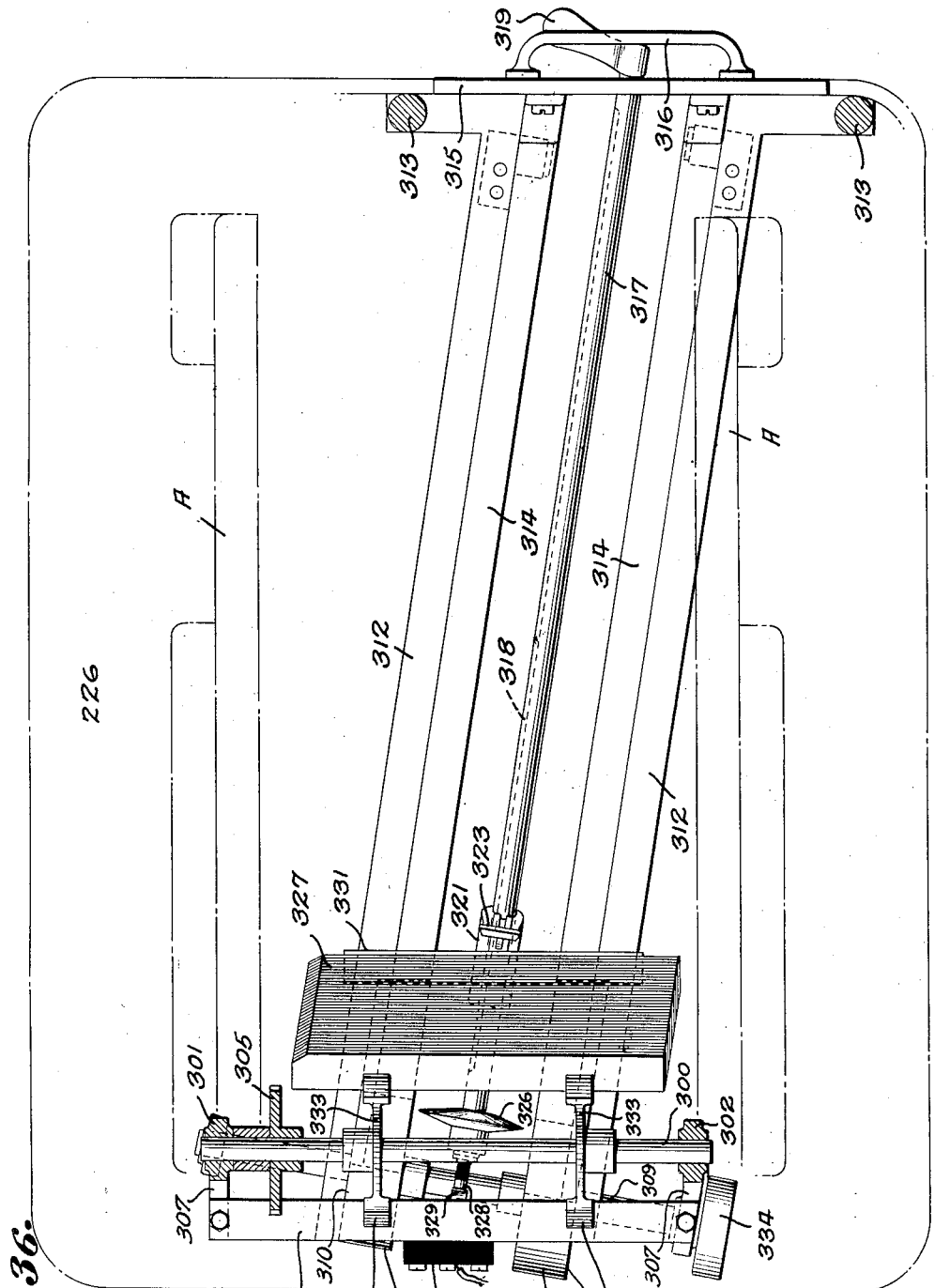

Jan. 13, 1942.   O. L. CLEVEN   2,269,894
TABULATING MACHINE
Filed July 28, 1939   20 Sheets-Sheet 18
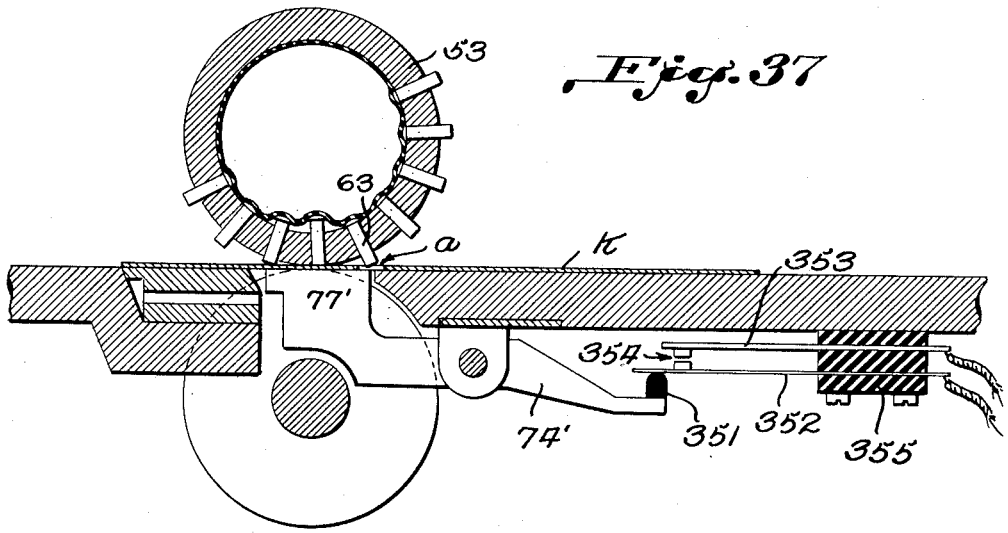
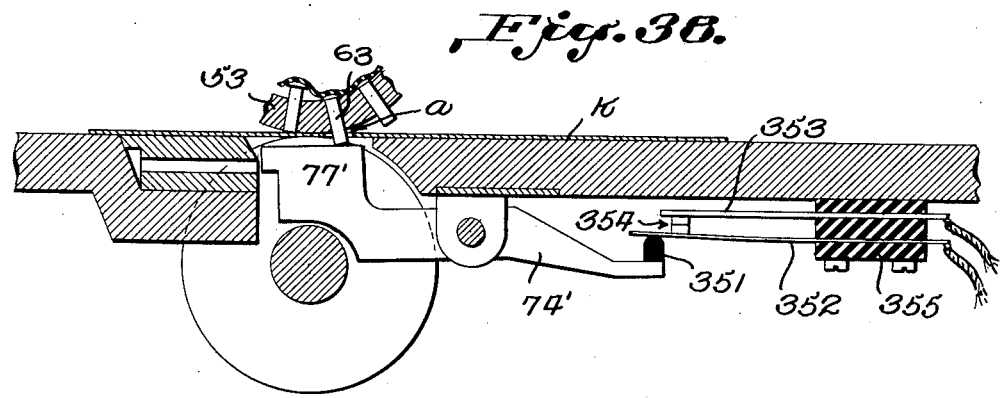
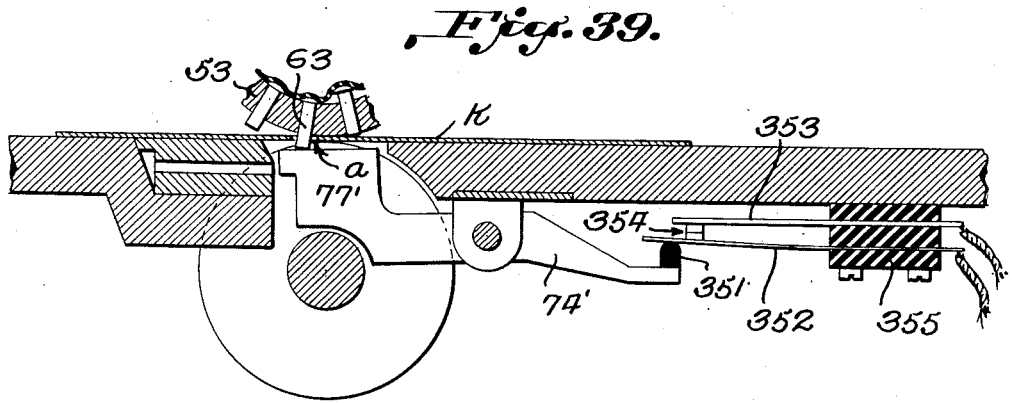
INVENTOR
O. L. CLEVEN
ATTORNEY Jan. 13, 1942.  O. L. CLEVEN  2,269,894
TABULATING MACHINE
Filed July 28, 1939  20 Sheets-Sheet 20
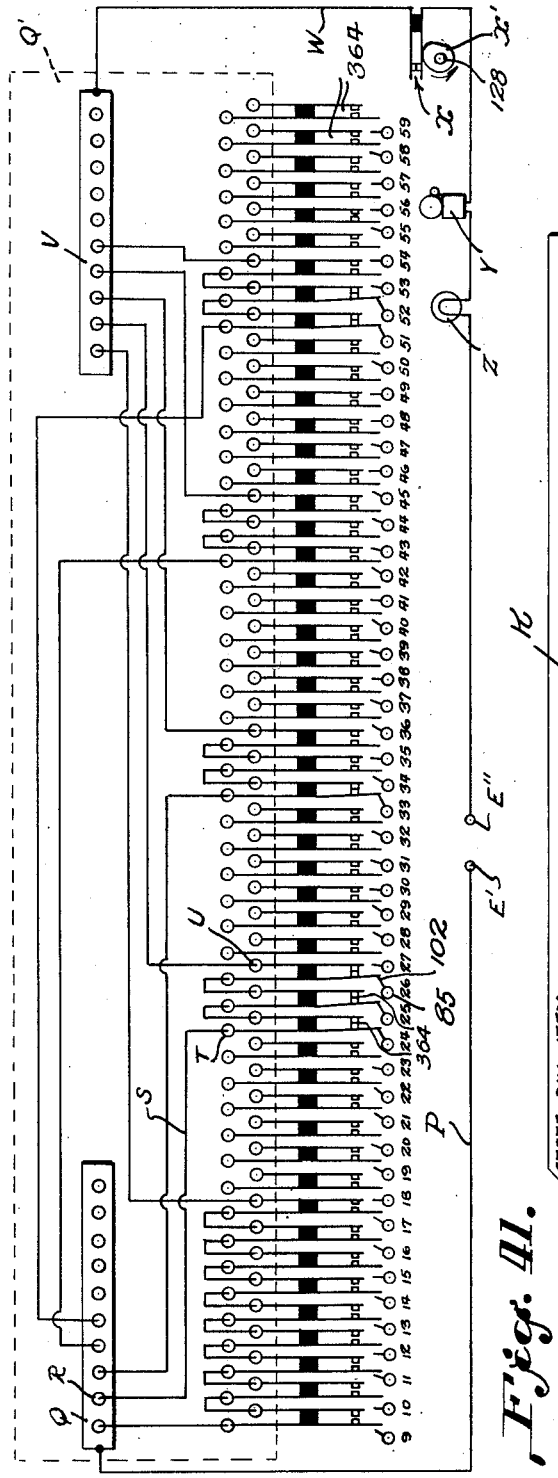
INVENTOR
O. L. CLEVEN
By J. B. Moorhead
ATTORNEY Patented Jan. 13, 1942

2,269,894

UNITED STATES PATENT OFFICE 2,269,894

TABULATING MACHINE

Oluf L. Cleven, Washington, D. C.

Application July 28, 1939, Serial No. 286,976

18 Claims. (Cl. 235—61.7)

(Granted under the act of March 3, 1883, as amended April 30, 1928; 370 O. G. 757)

This invention relates to improvements in tabulating machines or those machines that are operated by holes punched in a record.

Certain parts of the subject-matter of the present application will be found in my application Serial No. 249,465, filed January 5, 1939, and this application is a continuation in part of said application.

The invention described herein, if patented, may be manufactured and used by or for the Government for governmental purposes without the payment to me of any royalty thereon.

An object of this invention is to provide a machine in which a longer contact is maintained between the sensing elements and the accumulator mechanism when the latter is actuated. In the usual method of tabulation the time allowed for this contact is governed by the extent of the hole in the card as it advances through the machine. This contact time is limited by the size of the sensing elements as they must enter the hole and come out while the card is in motion, without damaging the hole. In the machine about to be described the sensing elements are "rolled" in through the holes and stay in contact a considerably longer time, which is determined by the diameter of the roll that carries the sensing elements.

Cards employed in these machines are frequently run a great number of times and the feeding knives employed, by coming in contact with the edges of the cards many times, soften, thicken and distort their edges, and otherwise the cards in handling become notched or dented at their edges, rendering the accurate positioning of the perforations with relation to the sensing devices uncertain, thus preventing the accurate tabulation of the information contained on the card.

I propose to overcome this objection, and one of the primary objects of this invention is to first feed the card from the feed hopper into a position wherein it is stopped momentarily for the purpose of automatically positioning and timing it in proper relation to the tabulating sensing elements before the feed rollers engage the body of the card to present it to said elements to be carried the rest of the trip through the machine.

A further important object is to so contrive and arrange the card control of the printing mechanism that this mechanism is accurately controlled at a point of transition from one group of cards to another, which is at the point where the card is in its momentarily stopped position. At this point the card is automatically "examined" and tried for correct group numbers, as represented and punched in the group control field or other fields used for control, before the card is presented to the tabulating sensing means for tabulation.

Another object is to provide a rotating sensing device whose construction will enable a number of them to operate in the close proximity to each other which is desirable in connection with the use of the usual card employed in statistical work, and which will move in synchronism with the card and thereby maintain longer contact through the perforation and more effective initiation of the actuating elements of the machine.

In machines of the type about to be described it is not an easy matter to change the machine to adapt it for different card runs, that is to say, to change it for the tabulation of different columns in different fields. These changes consume much time of an expert mechanician; therefore one of the objects of this invention is to provide a means for making these changes so simple that they can be conveniently and quickly made by the operator.

A still further object is to simplify the tens-carry or transfer mechanism by combining the carry and print controls, thereby eliminating costly and trouble-making mechanisms, and to affect the tens-carry simultaneously instead of progressively.

I believe that the feeding of the cards from the feed hopper at the front of the machine in horizontal position has advantages over the vertical feeding method, in that the pressure applied to the stack of cards to keep them in proper feeding position can be more conveniently applied, as by the use of a simple weight placed on the top of the stack. However, in the horizontal feeding, the cards are fed away from the operator through the machine to a stacking hopper somewhat remote from the operator, with the consequent inconvenience in retrieving them after tabulation. I propose to still feed the cards in a horizontal position from the feed hopper but to retrieve them automatically toward the operator and stack them in a suitable container underneath the front of the machine in convenient position to be reached, thus retaining the advantages flowing from the horizontal feeding while at the same time obtaining the advantages incident to the return of the cards to a position convenient for the operator.

The mechanism employed for the accomplishment of these purposes, just intimated, comprises means for stopping the machine when the stacker hopper has reached its capacity, and means for automatically stopping the machine should the stacker hopper be opened before its capacity has been reached, so that there will be no further feeding of the cards.

A still further object of the invention is to provide safety controls to prevent exceeding the capacity of any accumulator assembly.

In the drawings illustrating an embodiment of the invention—

Fig. 4 is a sectional view showing the sensing means; the accumulator; the tens-carry mechanism and the printing device; the sensing release lever being in locked or disabled position.

Fig. 4a is a fragmentary detail of the disabling device for the tabulating sensing means, showing a release lever locked in inoperative position.

Fig. 4b is a top plan of a portion of the disabling bar and pins.

Figs 5 to 7, inclusive, are fragmentary views showing card hopper, feed drum, and feed rollers, showing various positions of the feed drum, feed roller and card during the feeding operation.

Fig. 8 is a bottom plan view of the mechanism for adjusting the card for accurate registration with the tabulating sensing means.

Fig. 9 is a view taken on line 9—9 of Fig. 8.

Fig. 10 is a view similar to Fig. 9, showing the adjusting arms in open position.

Fig. 11 is a detailed view of the tabulating sensing roll, partly in elevation and partly in section, showing the sensing means or fingers and the pneumatic tube that backs the fingers.

Fig. 12 is a detailed section of the end of the sensing roll showing the valve for inflating the pneumatic element of the roll.

Fig. 13 is an enlarged sectional view of the sensing roll taken about on line 13—13 of Fig. 11.

Fig. 14 is an enlarged cross section of the sensing roll showing a modified form wherein springs are substituted for the pneumatic element shown in Figs. 11, 12 and 13.

Fig. 15 is a fragmentary longitudinal section taken on line 15—15 of Fig. 14.

Figure 16:
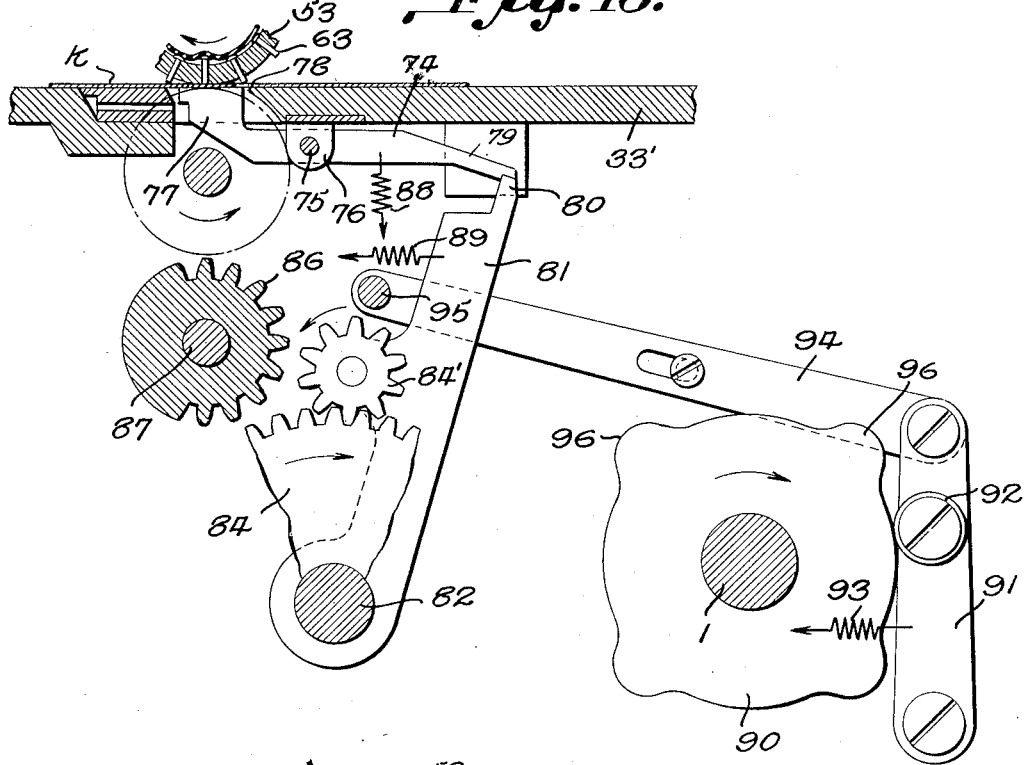

Figure 16 is a sectional fragmentary view showing the sensing roll and card with a perforation in position to be penetrated, the accumulator actuating arms and associated parts being in locked or neutral position, and also parts of the resetting mechanism.

Figure 17:
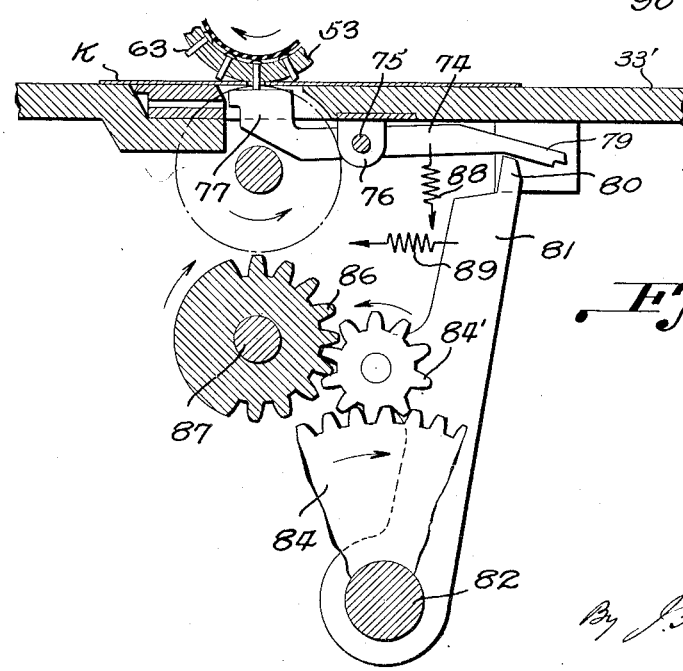

Figure 17 is a view with a sensing finger in operative position, with the consequent change in the positions of the associated parts.

Figs. 18 and 18a are detailed fragmentary views showing the no-card control for locking the accumulator actuating arms when there are no cards passing through the machine.

Fig. 19 is a view of the stabilizer for stabilizing or holding the card in the adjusted position in which it is left by the adjusting means in the adjusting station.

Figs. 20 to 24, inclusive, are fragmentary views of the transfer or tens-carry mechanism showing several positions of the accumulator wheels and associated parts.

Figs. 20a, 21a, 23a, and 24a are detailed fragmentary top edge views of the transfer levers showing various positions of certain pins and cams carried thereby.

Figs. 25 to 29 are fragmentary views of printing mechanism showing various positions of the parts.

Fig. 30 is a detail view of the reset mechanism showing the zero position of the accumulator wheels.

Fig. 31 is a right-hand side view of the machine showing the differentially wound magnet employed and certain parts controlled thereby, the side plate being broken away to show a single revolution clutch and certain adjacent parts, for printing and resetting the accumulator wheels and performing other functions, the plate being further broken away to show a position of the stack lifter with relation to the card feed hopper.

Fig. 32 is a view of a portion of the front of the machine partly broken away to show one of a group of control magnets and segments in connection with which it operates, and means for laterally shifting the magnets.

Fig. 33 is a detail of the device for locking the magnets in selected position relative to the segments.

Figure 1:
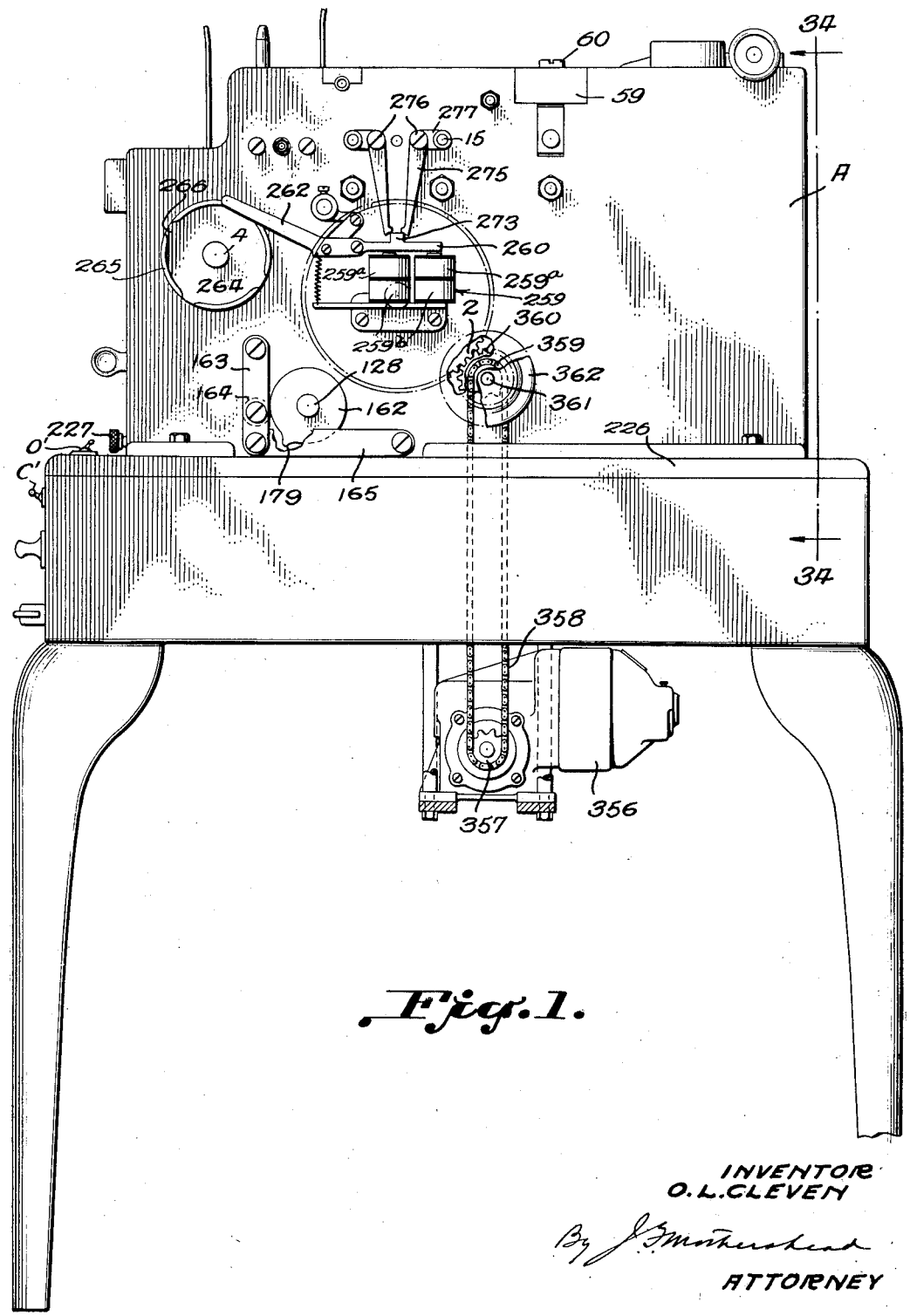
Fig. 1 is an elevation of the right-hand side of the machine.

Fig. 34 is a section of the machine taken on the line 34—34 of Fig. 1, showing the card chute, card feeding, and stacking mechanism.

Fig. 35 is a horizontal section taken along the line 35—35 of Fig. 34, showing the stacker mechanism receiving drawer and the jack control for making and breaking the motor circuit under certain conditions.

Fig. 36 is a top plan view of the mechanism shown in Fig. 35, the base and side plates of the machine being shown in dot-and-dash lines.

Figs. 37, 38 and 39 are fragmentary sectional detail views illustrating a modified form of means for electrically initiating tabulation operations.

Figure 40:
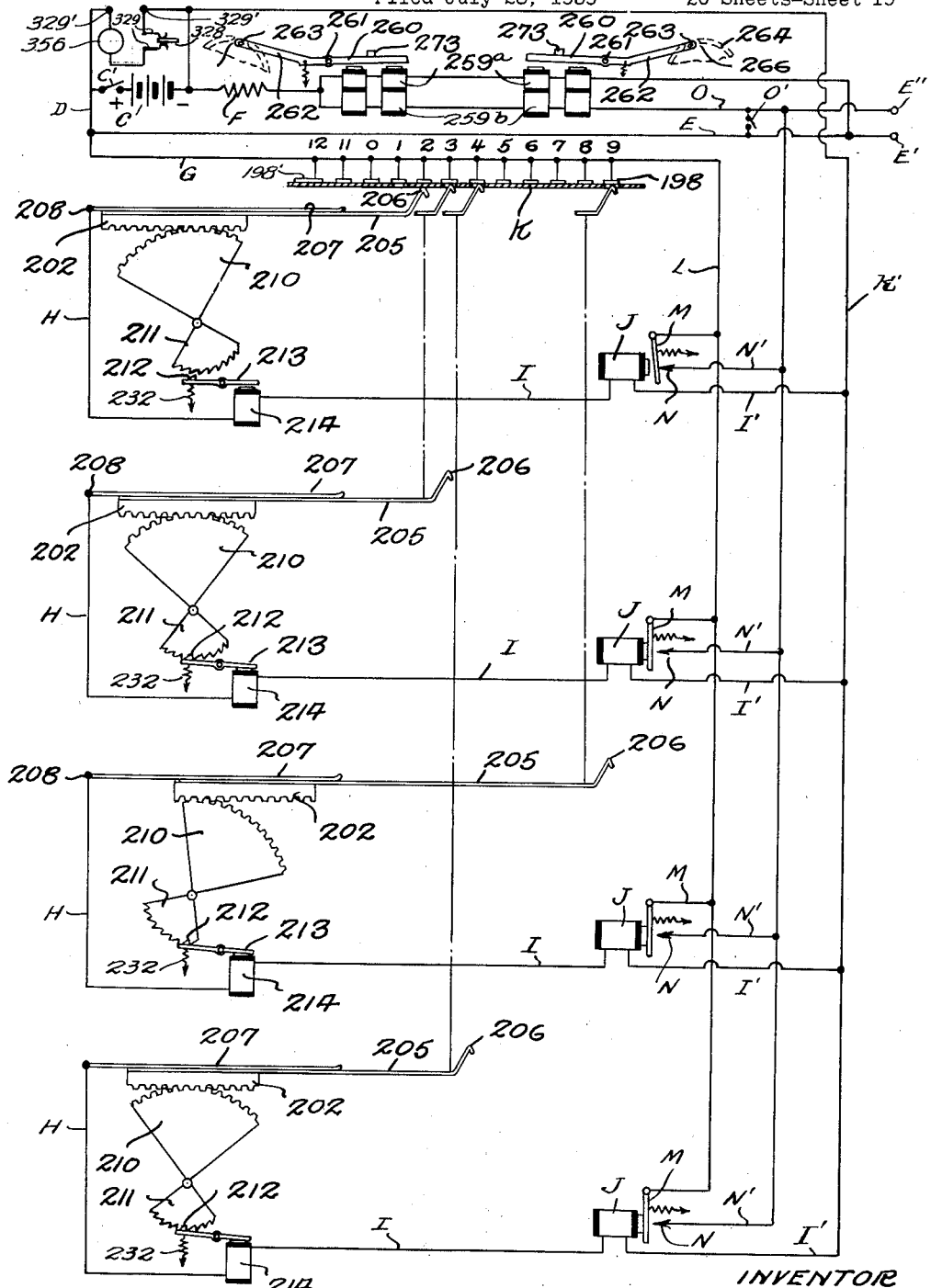

Fig. 40 is a wiring diagram showing the group control circuits in a conventional manner.

Fig. 41 is another wiring diagram used in the accumulator wheel capacity control.

Fig. 42 is a plan of a punched card, punched in accordance with the wiring diagrams.

General

The machine is small and compact and occupies little floor space. The frame comprises a table with legs supporting it at a proper distance above the machine support, there being an apron extending down from the table that covers such of the mechanism that is located below the table. For convenience in construction, assembling and adjustments, I prefer to provide two main outer side plates which contain certain of the elements, and another unit comprising two inner side plates in which certain other elements are mounted, which unit fits within or between the outer side plates, and which may bodily be inserted or removed from between said main or outer plates.

Driving mechanism

Referring to Figure 1, the numeral 356 designates a conventional motor with reduction drive, on the shaft of which motor is sprocket 357 driving, through chain 358, a sprocket 359 mounted together with a pinion 360 on a short shaft 361. This pinion is adjacent the side plate A and in mesh with the large gear 2 by which the machine is driven. On the outer side of said plate this shaft is provided with a hand wheel 362 for manually rotating the machine. This hand wheel has mounted therein a conventional clutch mechanism (not shown) to enable the operator to rotate the shaft 361 independently of the motor. The motor 356 is connected with the terminals 329' (Figure 40) and is in series with the contacts 329.

Card feeding mechanism

I prefer to use the rotary feed method as contradistinguished from the reciprocating method, as with the former, the card is fed to the feed rollers with the same speed at which the feed rollers will pick up and carry the card through the machine, thus avoiding speed variations in the movement of the card before the rolls get control of it.

In the drawings, A designates the main or outer side plates and B the side plates within the side plates. The numeral 1 designates the main drive shaft driven by large gear 2 attached thereto in the manner described above. Mounted on this shaft the large gear 2 (Fig. 3) is in mesh with a similar gear 3 mounted on shaft 4 journaled in the outer side plates A which shaft also carries the feed drum 5, provided peripherally with four feed knives 6 (Fig. 5), which during the rotation of the drum engage the side edges of the cards to feed them, one at a time, from the bottom of a stack of cards contained in a feed hopper 7 to the feed rollers 8 and feed rollers 9 and 10 through restricted orifice 11. These rollers 9 and 10 are mounted on studs 12 secured in a side plate A, and each roller has integral therewith a gear 13 which meshes with similar gear 14 integral with the rollers 8. The rollers 8 are mounted upon studs 15 carried by arms 16, mounted on studs 17 secured to side plate A, there being interposed between extensions 18 of arms 16, a spring 19 whose function is to hold the rollers 8 in feeding contact with the card. The lower rollers 9 and 10 are provided each with a cam 20 and 21 mounted between the roller and the gear and in position to engage a certain portion of rolls 8 to lift them at proper times from the card to free the card so it can be effectively operated upon by the rectifying or adjusting means.

Figure 2:
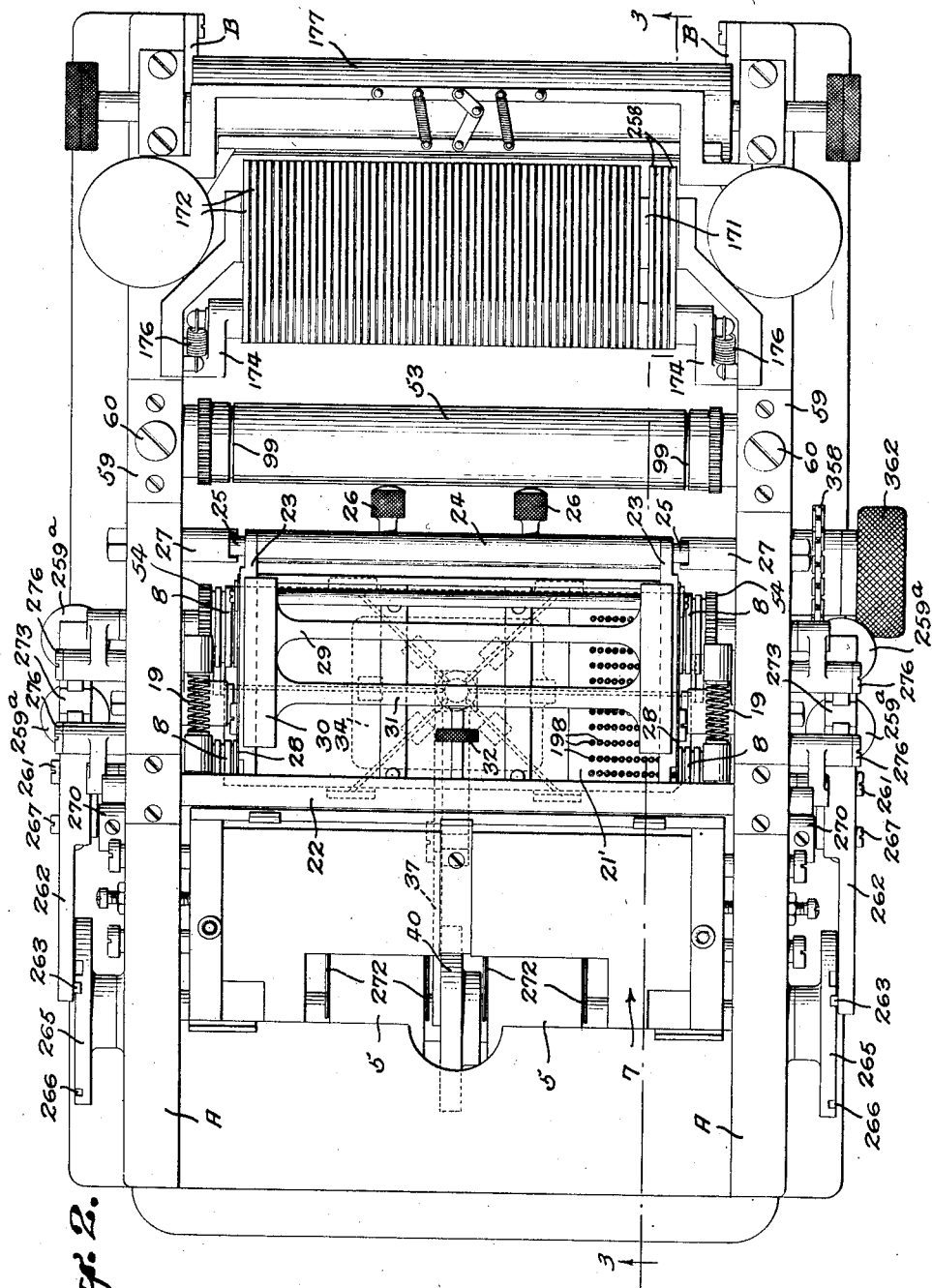
Fig. 2 is a top plan view, the base of the machine being omitted.
Figure 3:
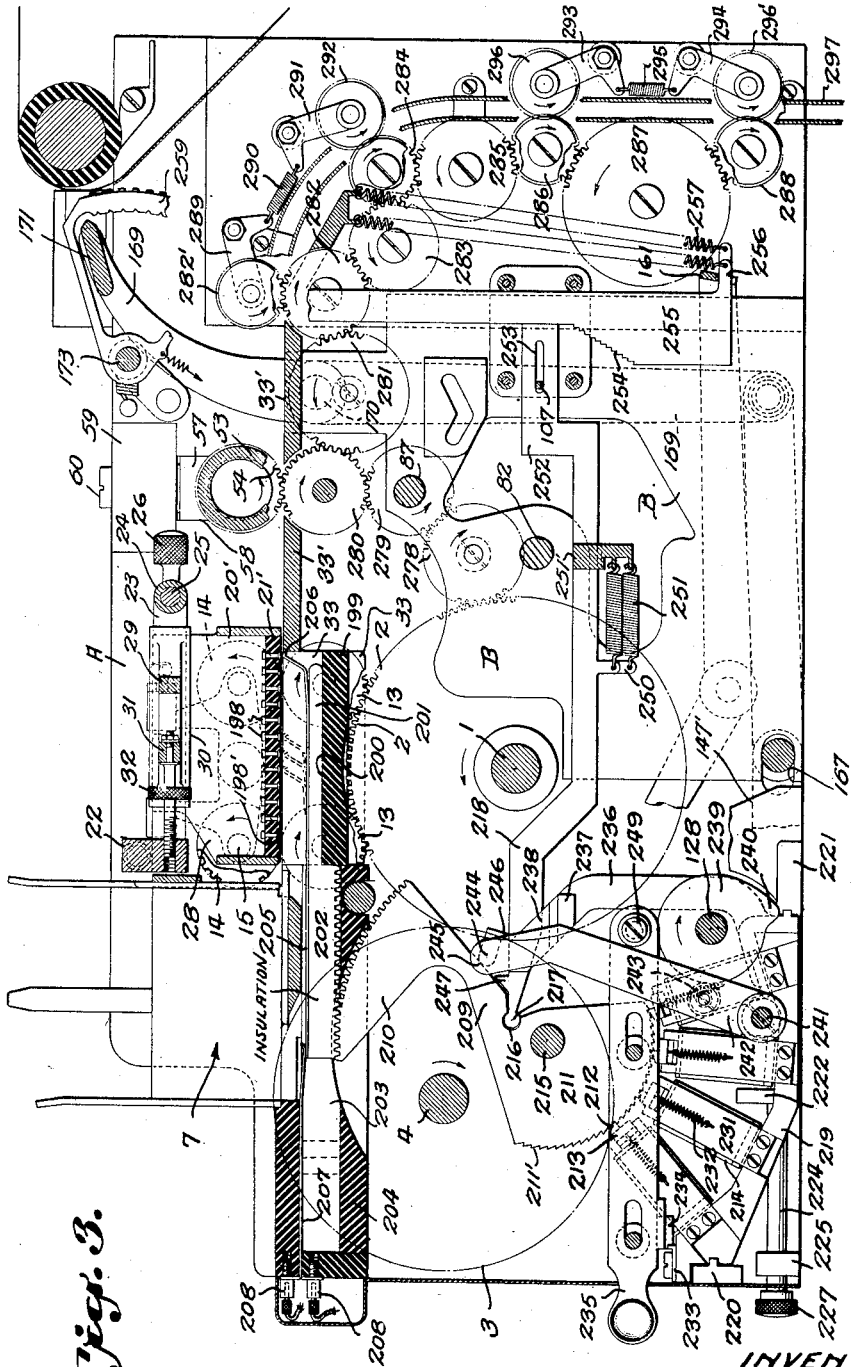
Fig. 3 is a vertical, longitudinal, sectional view showing the path of the card through the adjusting station, the location of the sensing means and card chute leading to the machine base, and also group control sensing means.

At the rear of the feed hopper 7 is a box 20', a part of whose bottom 21' is formed of insulating material and contains numerous contact points arranged in rows, there being a contact point for every possible hole in that portion of a card used for group control. At the rear of the feed hopper is a cross-bar 22 journaled in bearings in the side plates A (Figs. 2 and 3). Connected with this bar is a frame comprising two side pieces 23 between the forward ends of which is a tube 24 in which there are two spring backed bolts 25, to each of which is attached a knurled knob 26 serving as handles for raising and lowering the box upon its pivots to gain access to the parts below, and as means for moving the bolt to latch or unlatch the box and to lock it in its working position, there being provided two oppositely positioned studs 27 having sockets in their ends for the reception of the ends of the bolts 25. On the side pieces of this pivoted frame are mounted the side pieces 28 of the box in such manner that the box may have a sliding movement relative to the side pieces 23 of the frame. The plates of the box are secured to a slidable member 29 by screws passing through elongated slots in the side pieces 23. The part 29 comprises end pieces 30 that embrace and slide freely on the pieces 23. In the bar 31 of element 29 is drilled a hole for the passage of the shank of an adjusting screw 32 whose forward end works in a threaded socket in the bar 22, whereby the box and connected parts may be accurately adjusted longitudinally relative to the group sensing means below it.

In the usual machine of this type the work of sensing for the purpose of tabulating is accomplished at the point of location of the box just described; whereas in the present machine, no sensing for tabulation purposes takes place, but certain sensing for group control purposes does take place, as will presently appear. In this machine the sensing station just described is also used as a card adjusting station, that is to say, a station at which the position of the card is accurately adjusted for registration and timing with the tabulating sensing means, which adjusting mechanism will now be described.

Referring particularly to Figs. 3, 8, 9 and 10, the numerals 33, 33' and 33" indicate the deck or card support of the machine, and is composed of several pieces properly positioned and secured to appropriate parts of the machine. The card is fed into the station by the feed knife and engaged by the upper rolls 8 and lower rolls 9 and 10—first by the rolls 8 and 9, and when fed a sufficient distance, the card is engaged by the rollers 8 and 10 (Figs. 5 to 7). As shown in Fig. 7, a card has reached its position for adjustment and that position in which the upper rollers 8 are raised off the card by the cams 20 and 21, thus leaving it free of the feed pressure to be moved in any direction necessary for its adjustment.

Rigidly secured centrally to the bottom of the deck 33, is a rectangular plate 34 integral with which is a curved bracket 35 (Figs. 8, 9 and 10) pivotally supporting at 36 a lever 37 which carries at its free end a roller 38 running in a groove 39 in the face of cam 40 mounted on shaft 4. To the outer end of this lever is pivotally connected at 41 a stud 42 whose upper end enters and is guided in a circular opening in plate 34. This stud carries, near its lower end, an integral collar 43 that is embraced by the bifurcated ends 44 of the adjusting arms 45 pivoted at 46 to the lower ends of a number of brackets 47 integral with the plate 34. These arms are each provided at their upper ends with a flange 48 shaped to fit accurately against the side edges of the deck section 33, the arms being for the purpose of adjusting the card laterally. The rectangular plate 34 is provided with additional brackets 47' in all respects like the brackets 47 but positioned substantially at right angles to those shown in Fig. 10. These additional brackets, as shown in Fig. 8, are located near the ends of the rectangular plate 34, and to them are pivoted the longer arms 45. The other ends of these arms are provided with similar flanges 48' for the same general purpose and serve the same general purpose as the flanges 48, in that they function to adjust the card lengthwise. These flanges 48' extend through openings provided in the deck 33 adjacent the point selected for the placing of a card.

The cam 40 on shaft 4 moves in synchronism with the card and is so timed that when the card reaches the adjusting station and has been released by the feed rollers 8—8, the lever 37 will be rocked by the cam to lower the stud 42, and through the instrumentality of the collar 43 and the arms 45 will bring the flanges 48 and 48' to their operative position. As intimated, if the card when it reaches this station is for any reason out of time or adjustment, it is obvious that the simultaneous operation of the adjusting or correcting flanges will place the card in the position it should be in, in its further passage through the machine. The operation of adjusting the card is a momentary one, and immediately, almost simultaneously, the flanges 48 and 48', due to the timing of the cam 40, will be removed from the path of the card. During the adjustment, as has been described, the card will have been held upon the deck with a very light pressure, not enough to in any way interfere with its proper adjustment, by a device shown in Fig. 19, in which there is shown one of several cross bars 49 secured to the side of the box 28'. Headed studs 50 extend through these bars with their lower ends secured to a pressure plate 51, of which also there are several, there being interposed between the plates and bar light coil springs 52. The card is still in the adjusting station, but the time has come for it to resume its trip through the machine, and hence it is released by the passage of the cams 20 and 21 (Fig. 5) to allow the upper feed rollers to operatively engage the card and feed it to the tabulating sensing means. It is pointed out that the cams 20 and 21 are made of such comparative lengths that the cam 21 releases its upper roller 8 before the cam 20 releases its corresponding roller 8, thus obviating the likelihood of the card being buckled.

*The sensing and accumulator mechanism*

The detail construction of the sensing mechanism is best shown in Figs. 11 to 15, and details of the accumulator mechanism are best shown in Figs. 4, 16 and 17.

After leaving the adjusting station the card passes to and under the sensing roll 53 which is in the form of a hollow cylinder provided at opposite ends with gears 54 that mesh with the upper gears in a train of gears as shown in Fig. 3, presently to be described. The roll is provided with trunnions 55 and 56 that have bearings in blocks 57 (Fig. 4) seated in oppositely disposed recesses 58 in the side plates A, the blocks 57 being slightly spaced from the outer blocks 59. The upper block receives a threaded barrel 60 that encloses a spring 61 whose lower end is seated in a socket in the lower block, the arrangement being such that the barrel may be adjusted to vary the pressure of the sensing roll with respect to the accumulator release lever.

Circumferentially arranged in the sensing rolls are numerous holes 62 for the passing of sensing elements 63, the elements being arranged radially in rows, in the present instance 9, representing digits. There are longitudinal rows of said elements sufficient for tabulating the entire surface of a card. In the preferred form shown in Figs. 11, 12 and 13, the cylinder 53 contains a pneumatic tube 64 inflatable through the valve 65, let into the trunnion 55. Each sensing finger is provided with a smooth, rounded head for engagement with the pneumatic tube, which tube obviously exerts, when inflated, a constant pressure upon all the pins to normally keep them projected through the holes. Each end of the sensing roll is threaded for the reception of the threaded portion integral with the gear 54.

In Figs. 14 and 15, there is shown another form of the sensing roll designated by the numeral 66 with holes 67 corresponding with the holes in the roller 53, for the passage of fingers 68 provided within the cylinder, with stops 69 to limit their outward movement, the inner ends of the fingers being received and guided in radially arranged holes 70 in washers 71 keyed to a shaft 72 which is extended beyond the roll and provided with suitable trunnions, such as 55 and 56 for bearing in the side plates, the fingers being urged normally outward by springs 73 interposed between the stops and washers.

Referring now to Figs. 4, 16 and 17, numeral 77 designates the accumulator release lever of which there is one for each card column to be tabulated, and each is pivotally mounted on a common shaft 75 supported in numerous brackets 76 secured to the under side of the deck portion 33'.

The rear end of this release lever is broadened as at 77 and extends through a suitable slot 78 in the deck, there being an individual slot for each lever. The front end 79 of the lever is engaged by the upper narrowed end 80 of an accumulator arm 81 (of which there is one for each release lever), and forms a stop latch for said arms. This arm is rockably mounted on shaft 82 supported in the inner side plates B, upon which shaft is rotatably mounted all of the accumulator wheels. Each wheel comprises a toothed disk 84, and a peculiarly shaped or stepped readout cam 85 (Fig. 4) for controlling the tens-carry mechanism and the printing mechanism.

Rotatably mounted on a stud on this arm is a pinion 84' which at all times meshes with the teeth of the disk 84 and is adapted to be thrown into an outer engagement with the teeth of a partial gear 86 positively mounted on shaft 87, which shaft is journaled in the side plates B the gear 86 being preferably made in a single piece extending entirely across the machine, or in other words, this gear is common to all of the pinions 84'. The long gear 86 is rotated by a gear 279 in the train that rotates the sensing roll 53 as shown in Fig. 3, in synchronism with a card—say for instance, when the sensing finger "5" encounters the hole representing "5" on the card, as in Fig. 17, the release lever 74 will be tripped against the influence of spring 88 and release the arm 81, and said arm under the influence of the spring 89 will bring the pinion 84' into engagement with the gear 86, in such time as there will be left 5 teeth on the long gear 86, to move, through the medium of the pinion, the disk or accumulator wheel 84, a corresponding number of teeth and thus add "5" to the amount of the accumulator. When the amount is added, then it is necessary to withdraw the accumulator arm 81 back to latched position, or that position shown in Fig. 16, ready for a successive operation, which is or may be effected by the following card. This operation is accomplished by the movement of a cam 90 mounted on the main shaft 1, which extends entirely across the machine, there being two of these cams, each of which lies close to the side plates. Adjacent the cams, on each side of the machine, is a lever 91, each pivoted to a short stud on the main side plates A. The lever carries a roller 92 held in constant contact with the cam by a spring 93. To the upper end of each lever 91 is pivoted a resetting arm 94, the ends of the arms being connected crosswise of the machine by a bail 95 adapted to be brought simultaneously into contact with all of the arms 81 that have been actuated in the course of tabulation, to bring the arm back to latched position, or that position shown in Fig. 16. This action occurs when the roller 92 engages one or another of the projections 96 of the cam, there being four cycles of the cams and the accumulator wheels to one rotation of the shaft 1.

A retrograde movement of the accumulator wheels is prevented by a detent 81' (Fig. 4) whose spring teeth are arranged to separately engage the teeth of the accumulator wheels, the detent also serving to properly align the wheels and prevent unwanted movement. The detent is provided at each end with an ear 81'' perforated for the passage of a screw for attaching it rigidly to the wall of the inner side plate B.

No-card control

Referring particularly to Figs. 18 and 18a, the numeral 97 designates one of two no-card levers. These are pivoted on shaft 75 upon the same shaft with the accumulator release levers 74. These no-card levers are formed with a rearwardly extending end 98, which extends into a groove 99 in each end of the sensing roll, and in the path of the card, the other ends of the levers being connected by a bail 100 extending across all the accumulator arms 81 and in position to engage with the forward edges of the arms, as shown in Fig. 18. Obviously, when there is no card in the machine, the bail 100, under the influence of spring 101, will be pulled down, consequently preventing any of the arms 81 from operating, and at this time the rear ends of the no-card lever will be in the grooves 99 of the sensing roll. However, when a card is brought in from the adjusting station to the sensing roll, it will depress the rear ends of the no-card levers and force the bail 100 upward and remove the interference with the arms 81, permitting them to operate or be brought to the position shown in Fig. 18a, when a release lever 74 has been released by a sensing finger passing through a hole in the card.

Tens-carry or transfer mechanism

Referring now to Figs. 4 and 20 to 24a, it will be noted that the step readout cam is formed with with four identical arms, each having ten steps thereon whose "treads" are all exactly radial with the shaft 82, but vary in distance from the center of the shaft, which arrangement of the steps, however, has nothing to do with the tens-carry, but control the printing mechanism, presently to be described. However, at the extreme points of these arms cams 102 are provided, which engage a two-point cam 103 formed on the upper edge of each print and tens-carry lever 104, which levers perform important function in connections with both the tens-carry and the print control mechanism. There will be one of these levers for each accumulator wheel, and each is formed with a rearward extension 105 in which there is an elongated slot 106 through which extends a rod 107 which is secured to the side plates B and which is common to all of said levers, and upon which they all rest and slide. The opposite end of the lever is cut away to form a shoulder 108 and an extension 109. These levers cooperate with a cross bar 110 between the side plates B, the bar forming a stop for said levers until they are moved down and off the bar by the cam 102 of the step readout cam 85 and urged forward by spring 111 secured to a pawl 112 pivoted to the lever at 113 (Fig. 20) until its hook 114 momentarily rests in a groove 115 formed in the forward end of a plate 116 pivoted at 117 to the lower end of a lever 118 pivoted at 119 upon a stud 120 on the inner side of the main side plate A. There is a lever corresponding to lever 118 mounted on the other side of the machine, and each carries a roller 121 held in engagement with cam 122, the like of which is also on the opposite side of the machine, the cams being mounted on shaft 1. Springs 123 urge the rollers 121 against these cams and spring 124, at each end of the grooved plate 116 (Fig. 21) urge this plate upward to assure the entrance into the groove of the hook ends of the levers. The springs 124 are just sufficiently strong to support the weight of the plate 116 and hold it in its working position, which is mainly in a horizontal direction. In Fig. 20 the roller stands in the position on the cam in which the print and tens-carry lever 104 may be momentarily held in the groove 115 until the sensing cycle is completed, at which time the cam has advanced to the position shown in Fig. 21, permitting the advance of lever 104 and attached pawl 112, under the combined influence of springs 111 and 123, to the positions shown in Fig. 21, in which the nose of the pawl 112 is in position to engage the next tooth of its associated accumulator wheel. On a further movement of the cam 122, the high point 125 reaches the roller 121, which action will rock the lever 118 rearward, bringing with it the grooved plate 116, the lever 104, and the pawl 112, causing the pawl to engage its associated accumulator wheel to advance one tooth, representing one digit, and causing the lever 104 to lock behind the crossbar 110, as shown in Fig. 22.

In tens-carry mechanism in machines of this character wherever a number is added to 9, it must affect the next higher accumulator wheel, thus carrying 1 to this next higher wheel. For instance, one of the accumulator assemblies may be so positioned as to represent a succession of the numeral "9," as shown in Fig. 4, wherein it is intended to show that several of the stepped readout members 85 are side by side in exactly the same position, and all registering "9" in which position the cam points 102 have engaged the lower step of the two-step cam 103 and brought the lever 104 down to the position shown on the stop-bar 110. Now as the wheel passes from this position to a larger number, the print and tens-carry lever 104 is depressed and clears the stop-bar 110. There is on each transfer lever, near its forward end, a pin 126 which cooperates with a cam 127 carried by the next higher value or adjoining lever throughout the machine, or in other words, each lever is provided with a pin on one side and a cam on the other. When a successive group of accumulator wheels are at "9" and an accumulator wheel of lower value passes to the "0" position, its corresponding transfer level is positioned to carry one to the next higher wheel, and in doing so the pin 126 will slide over the cam 127 on the next higher value transfer lever and disengage said lever from the stop-bar 110, and in doing so this lever, in turn, will operate upon the next higher in the same manner, and so on until the carry operations have been effected in the successive higher order wheels as required, as progressively illustrated in Figs. 22, 23 and 24—plan positions of the pins and cams on the transfer levers being shown in the other figures of this sheet.

If an accumulator wheel stands in any other position than the "9" position, the pin 126 passes under the cam 127 and in no way disturbs the adjacent lever.

Referring to Figure 20, the lower order accumulator wheel 84 has passed to "0" position and in doing so engages the point 103 of its associated lever 104, and depresses said lever to a point below the stop bar 110, as shown. Meanwhile the shaded lever 104 with its associate accumulator wheel 84 is standing on "8" and in the position shown in this figure. Upon further movement of the cam 122, as shown in Figure 21, and between cards, the lever 104 under the influence of spring 111 will move forward and allow the pin 126 to pass under the cam 127 of the shaded lever 104 or next higher order lever, which operation is shown clearly in Figures 20a and 21a. On still further movement of the cam 122, as shown in Figure 22, through instrumentality of lever 118, the lever 104 is brought back on stop 110 and while moving back to this position the pawl 112 engages the next higher order accumulator wheel 84 and advances this wheel one step.

Referring to Figure 23, the step read-out cam 85 associated with the front lever has passed from "9" to "0." The next higher order read-out cam is standing on "9" on its associated lever 104, which lever is partly depressed as shown. In the position of the cam 122, as shown in Figure 21, it has allowed the lever 118 to be rocked forward under the influence of spring 123 and has allowed lever 104 to move forward also, and as shown in Figure 24, allows the pin 126 on lever 104 to engage cam 127 on adjacent lever of higher order and exert a camming action between said cam and pin, thereby depressing the lever to a point below the stop bar 110. This operation is further illustrated in Figures 23a and 24a, wherein, in the former or Figure 23a, the pin 126 is shown about to engage the cam. In Figure 24a the pin has reached a point where the next higher order lever has been depressed and brought to position shown in dotted lines in Figure 24, in which position the lever 104 is free to move forward as heretofore described. While all levers which have been acted on by a tens-carry operation are being reset back on stop bar 110, each lever with its pawl 112 will advance its adjacent accumulator wheel of higher order one step, thus carrying one to the next higher order wheel.

At the start of any tabulation operation, the accumulator wheels and their associated levers are simultaneously reset, the wheels to zero and the levers to their normal position against stop 110' of stop bar 110. In Figure 30 the levers are shown to have been reset by bail 186, acted upon by cam 181. While the levers are in the position shown in Figure 30, the pin 196, which extends a short distance on each side of the lever 104, will extend on one side of the lever between two teeth of its related accumulator wheel, while on the other side of the lever the pin serves as a stop for the upward movement of the pawl 112. Upon movement of the accumulator wheel initiated by either a carry operation or upon a record-control operation, the pin 196 will be engaged by a tooth of its related accumulator wheel, thus depressing its related lever, bringing it to the position shown by the forward lever in Figure 25. This forward lever in this figure is in position for a printing operation, while its adjacent lever not having been acted upon remains on stop 110' and is out of the path of the bail 149 and will not be engaged by it upon the downward movement of said bail. Upon the downward movement of the bail the forward lever is carried down to the position shown in Figure 26, where its finger 151 is brought into engagement with its appropriate step on read-out member 85, allowing the digit corresponding to the step to be printed on the result sheet. The adjacent lever that was not acted upon remains on the stop 110', as shown best in Figure 26, and allowed no printing.

When there is a carry upon a carry, that is to say, when a series of adjacent order wheels stand at "9" and a carry is required, the forward urge of spring 111 of each lever is sufficient to successively carry from one lever to another, successively bringing into operation the pins 126 and the cams 127, as heretofore explained.

*Printing and reset mechanisms*

The printing mechanism is for printing the results of the operations of the accumulator mechanism which result is interpreted upon a suitable result sheet and represents the totals of a tabulated card group. The machine contemplates the provision of a mechanism controlled by different groups of cards—for instance, cards for different geographical districts, and automatically printing results of the tabulations of each district. The first card of a new group entering the adjusting station will momentarily stop further tabulation and initiate the printing operation by the tripping of a single revolution clutch.

Referring to Figure 31, the numeral 128 designates a shaft journaled in the main plates A and to which is keyed a collar 129 having arm 130 integral therewith to which is pivoted a pawl 131 comprising an extension 132 and an arm 133 ending in a tooth 134 adapted to enter one or another of the spaces between the teeth on a wheel 135 which is rigidly secured to a gear 136, the gear and wheel being loosely mounted on the shaft 128, which wheel by reason of engagement of its gear 136 with large gear 2, rotates constantly when the machine is in operation. Pivoted on a stud 137 on the main plate A is a latching lever 138 having a notch 139 in the under side of its forward end, and its opposite end carries a pin 140 which extends into an open end recess 141 in the lower end of a link 142, the rear end of the latching lever being constantly urged upward by a spring 143. When the link 142 is depressed by the card controlled means later to be described, the notched end of the latching lever 138 will be raised, releasing the pawl-carrying arm 130 and permitting the leaf spring 144 to force the tooth 134 into engagement with the toothed wheel 135, thus gearing the arm with the shaft 128, carrying the clutch with its several parts around one revolution, at the end of which the arm will be again engaged by the latch to arrest the movement of the clutch and shaft upon which it is mounted. The numeral 145 (Figs. 4 and 25) designates a cam, of which there are two mounted on shaft 128 just inside the side plates A, and the numeral 146 designates a lever, of which there are two, one on each side of the machine. These levers are pivoted on studs 147 on bracket 147' integral with bar 221 (Fig. 4) and each lever carries a roller 148 for engagement with the cams, the rear ends of the levers being constituted by a bail 149 extending across the machine, the levers and bail being urged constantly downward by springs 150. The bail 149 is adapted at all times to engage all of the levers 104 that have been actuated during tabulation, and will, as will presently appear, miss all those levers that have not been actuated. It is immaterial, if in the printing operation, zero should fail to be printed between printed characters on the result sheet, since the spaces between said printed characters will be such as to denote their denominational magnitude.

As shown in Figure 25, the cam is just about to release the roller 148 from its high point and when it is released the levers and bail will be moved down by the springs 150 and the bail will engage and depress the forward hooked ends of the levers 104 that happen to be in its path, missing those that happen to be in the position of the higher levers in Figure 25, the levers in such higher position being those that have not been actuated in the tabulation operation, and consequently will not be operated in the final printing operation. The extent to which the hook ends of the levers 104 will extend beyond the stop bar 110 will be determined by the position of the particular step of the step readout member engaged by the lever. Each lever 104 is provided with a finger 151 arranged to engage one or another of the radial steps 85' on the arms of the step readout members 85, each step representing a digit from "0" to "9."

In moving downward after it is released by the cam, the bail 149 near its opposite ends will engage the upper ends of the two pins 152, one at each end of the grooved plate 116, and depress said plate and keep it from interfering with the free movement of the levers 104 toward the front of the machine.

In Figure 26 there is shown a position of the front lever 104 in which the nose or finger 151 is on step corresponding to the digit "2" on its associated accumulator wheel. The numeral 153 (Fig. 4) designates vertically movable step readout bars broadened at their lower ends and provided with a series of steps 154, each one of which, except the top step 155, represents digits from "0" to "9," the bottom step representing "0." This bar is further provided with a lateral extension 156 to the outer end of which is attached the lower end of a lifting spring 157 for lifting said bars to a position to be engaged by the rear ends of the lever 104. There is a bar 153 for each accumulator wheel assembly and for each lever 104. These bars extend up to a point just below the deck portion 33" (Fig. 4) leaving clearance above the deck for the passage of the card through the machine. Interposed between these bars 153 and cams 145 (Fig. 27) are two levers 158, one on each side of the machine and pivoted at 158' on studs secured to the side plates B. The front arms 159 of the lever carry rollers 160 for engaging with the cams 145, the other arms 158 being connected by a bail 161, which extends across the rear edges of all of the bars 153 in position to engage the extensions 156 and depress all the bars to bring them to their lowermost or reset position after the printing operation. In Figure 27, two of the bars 153 are shown in printing position due to the further advance of the cam 145 which has permitted the two raised bars to reach certain appropriate steps on the bars, as determined by the positions of the levers 104, and make the proper set-up for printing.

In Figure 28 there is shown another cam 162, one of which is on each side of the machine and mounted on the outside of the main side plate A (Figure 1) on shaft 128. This cam actuates the printing mechanism through the various elements comprising this mechanism. Adjacent this cam, also on the outside of the plate, is pivoted a lever 163 which carries a roller 164 in engagement with the cam 162, the lower end of such lever being pivoted to a link 165 extending rearward for a short distance, where its pivot 166 extends through an elongated slot 167 (Figs. 3 and 4) and is pivotally connected to a similar link 168 on the inside of said plate. These cams, levers and links are duplicated on each side of the machine to provide against undue torsional strains. The links 168 at their rear ends are pivoted to the lower ends of the print levers 169 rockably mounted on studs 170 on the side plate A, the upper ends of these levers being connected by a push bar 171 which extends crosswise of the machine through the openings in the printing sectors 172, there being one of these sectors for each accumulator wheel. These numeral-bearing sectors are mounted on a common shaft 173, which is supported in toggle link 174, one of each being mounted upon stud 175 on the side plates, there being a spring 176 for retracting the sectors away from a platen 177, there being also a spring 176' for each sector normally holding them in their lowermost position. To the lower part of each sector is pivoted a swinging link 178 that spans the space between the sectors and the upper ends of the bars 153, and in position to be engaged by the bars 153 to raise the sectors to their appropriate printing positions, commensurate with the extent of upward movement of the bars as determined by the movement represented on its particular associated accumulator wheel. These printing sectors being now set for printing and in their various positions to present in a straight line the numerals representing the value of the tabulating operation, the cam 162 (Figure 28) will have further advanced and high point 179 thereof will engage the roller 164 and actuate levers 163 and the links 165 and 168, which in turn rocks the printing levers 169 causing its push bar 171 (Figure 4) to engage one or another of the notches 180 on the inner edge of the curved portion of the sectors, thus pushing the sectors against the platen to print the result on the result sheet, it being understood that there will be an ink ribbon between the result sheet and the platen. The ink ribbon between the platen and the paper is preferably the usual narrow one running lengthwise of the platen, which may be shifted by well-known means and will always be in position to have the paper pressed against it by the lateral impact of the type elements on the printing sectors, it being understood that the type elements on the printing sectors are not reversed and the printing will be on the back of the result sheet so that when said sheet is brought to position for reading the printing will appear in conventional manner.

It is obvious that at the time the print is made the various bars 153 will be extended to various heights through the deck 33" (Figure 4), and it is now necessary to reset them to normal position.

Resetting is accomplished by the further movement of the cam 145, which brings the high point of the cam in engagement with the roller 160, which rocks the levers 158 bringing their bail 161 down, which brings all of the bars down as a result of the engagement between the bail and the rear extensions 156 of the bars against the influence of springs 157. Now that the bars 153 and sectors have all been to normal position, it is necessary to reset or bring to normal position all of the levers 104 that had been actuated, and with them their associated accumulator wheels.

Referring particularly to Figure 30, the numeral 181 designates a cam centrally mounted on the single revolution shaft 128, which cam is for actuating reset elements for resetting the levers 104, and accumulator wheels. There is a bracket 182 pivoted at 183 to a suitable support near the bottom of the machine and which carries a roller 184 in engagement with the cam 181. The bracket is recessed for the passage of the lever 185 and on its upper end supports a bail 186 which extends virtually for the whole width of the machine. To the rear end of the lever 185 is pivotally connected at 185' the lower end of lever 187 fast to a transverse rod 188 mounted in the inner side plates B. Near each end of the rod 188 is rigidly attached a bent lever 189 in the upper end of each of which is pivoted at 190 a comb holder 191, and carried by these holders is a comb 192 that extends substantially for the entire width of the machine, there being a comb tooth for each accumulator wheel. Each comb holder carries a roller 193 which works in an angular cam slot 194 formed in each of two plates, 195, one of which is secured to the inner side of each side plate B. In the position of the cam as shown in Figure 30, the high point 196 has engaged the roller 184 and caused the bail 186 to force all of the levers 104 to normal or reset position. By this same movement of the bracket 182 the bent levers 189 will be rocked forward and will bring a tooth of the comb into contact with the under side of any arm of the step readout cam member 85 that has been actuated, the position shown in full lines (Figure 30) being the "zero" or reset position. However, previously to reaching the full line position shown in this figure, the cam 181 has so actuated these levers 189 as to bring them and the comb from the various dotted line positions to this point. In doing so the rollers 193 on the comb holder have advanced from the highest point of the cam slot 194 and reached its final point at the outer end of the slot with a sweeping movement, and in doing so will bring a comb tooth into engagement with the under side of an arm of any step readout member 85 that is not standing in "zero" position, to carry it to such position.

Obviously, there may be in many tabulations a number of accumulator wheels that have not been actuated and these will not be disturbed because they are already in zero position.

It is not desirable to print on result sheet an unnecessary number of zeros or noughts in the printing of the amount representing tabulations. For instance, in a case where nine accumulator wheels are used in tabulation in any card field, and the total for that group of cards, is, say, 365, it is inconvenient and unnecessary to print six zeros in front of this amount. Therefore, it is my purpose to obviate this as will appear.

As shown in Figure 30, all of the levers 104 are in reset position when the upper ends 104' of the lever shoulder are in engagement with the primary stop 110' of the stop bar 110 and in position to be actuated to tabulate a new group of cards. Each of the levers 104 carries a pin 196 which lies in the path of the movement of the outer ends of the teeth of its associated accumulator wheel and upon the first movement of the wheel, whether actuated by the card or by the transfer mechanism, this shoulder will be knocked off the primary stop 110' and, under the influence of spring 111, will abut against the stop but below the primary stop or in the position shown by the front lever in Figure 25. When lever 146 is actuated to initiate a printing operation its bail 149 will miss all of the levers that remain on the primary stop, thus preventing any of such levers from taking a print in the printing operation. However, it is obvious that any of the levers that have been actuated, with their ends extending in the path of the bail, will be depressed by said bail, as shown in Figure 26. It is also obvious that there has been no action of the accumulator wheels associated with the levers that remain on the primary stop 110' and no printing of any sort will be effected from these unactuated accumulator wheels, the rear ends of these unactuated levers 104 meanwhile remaining on the large step 155 of the bars 153. This large step is for the purpose of bridging the gap in the path of the card between the upper ends of the bars 153 and the bottoms of the links 178 carried by the printing sectors.

*Group control mechanism*

In tabulating operations it is desirable to get the results of tabulations for, say, geographical areas with relation to, say, various products or commodities in such areas. For this purpose the cards have been sorted into different groups, as represented by certain holes punched in the card in the control field or elsewhere. When a certain group of cards for a particular area has been tabulated and when the first card of another group reaches the adjusting station, it will be momentarily stopped and held and a printing operation will be automatically initiated for obtaining the total of the first group; or in other words, it is ordinarily the first card in this succeeding group that initiates the printing for the group that has preceded. The printing of the last group, there being no succeeding group, is manually initiated.

The bottom 21' of box 20' (Figure 3), as stated, is provided with numerous contact pins 198 and 198' connected together one for every possible hole in the group control area in a card. In the illustrated mechanism I use the first twelve card columns for control purposes, as shown in Fig. 42, although a greater or less number may be employed. These columns are used for group control purposes and are on the left hand end of the card commonly used as the group control field, although other columns may be used for control purposes. As the machine illustrated is constructed, it takes care of the first twelve columns of the card, but may be designed to take care of any field or fields.

Suitably supported in a bracket in the deck portion 33 below the box 20' is a block 199 of insulating material which is provided with twelve grooves 200. The numeral 201 indicates the narrow end of the rack bar 202 of insulating material, there being a rack bar for each groove. The racks are supported and slide in grooves 203 in a block 204 also of insulating material. Each rack carries a narrow strip 205 of conducting material. The rear ends of these strips terminate in sensing fingers 206 which are bent to make electrical contact through holes in the card with such of the contact pins 198 as may be used in the control, the resiliency of the metal of the strips being utilized to make the proper contact. Arranged above each groove 203 is a narrow spring material strip 207 of conducting material. These strips make sliding contact with the contact springs 205 to complete the circuit between the contact points 206 and the plug binding posts 208, there being a strip and a binding post for each of the twelve racks.

The insulating material block 199 is formed with a plurality of grooves 200, twelve in the present instance, which receive the slides 201 and the sensing fingers 206. This block is received in a transverse recess that extends a sufficient distance below the deck 33 to accommodate these members, as shown in Figure 8.

The numeral 209 designates a two-arm segment, a toothed arm 210, and a ratchet tooth arm 211 there being a segment 209 for each rack bar 202, the toothed arm enging with a rack 202 and the ratchet tooth arm engaging with stops 212 on armatures 213 of a series of four magnets 214. The segments are loosely mounted on a stud 215 secured to the side plate A, and each is provided with a circular open side opening 216 which embraces the circular heads 217 of a series of four print levers 218 to be later described.

The numeral 219 designates an arcuate platform or carriage upon which the radially arranged magnets 214 are mounted, these being positioned in different planes so as to bring the stops 212 in position to engage the ratchet tooth segment 211. The platform is mounted in guides 220 and 221 (Figure 3) secured to the side plates of the machine and the guides are of such length as to permit the platform and its magnets to move laterally for a sufficient distance to enable the magnet stops to engage the teeth of any four of the adjacent ratchet segments. Referring to Figure 32, the numeral 222 designates a rack bar secured to the platform and arranged to engage a pinion 223 carried by short shaft 224 mounted in suitable bearings 225 on base plate 226, the shaft being provided with a knob 227 by which the pinion is actuated to move the rack, and consequently shift the platform to any desired position relative to the ratchet segments.

There is an opening 228 in the front cover plate of the machine through which may be observed numerals on a disk 229 fast to the shaft 224 for the purpose of indicating exactly the position of the magnets relative to the ratchet segments. As seen from this Figure 32, the armatures 213 are pivotally mounted at 230 to brackets 231 secured to the platform 219, the armatures being urged out of engagement with the ratchet segment by springs 232 when the magnets are not energized. The means for holding the whole platform and accurately locating it comprise a bar 233 (Figures 3 and 33) mounted on the plarform and provided with a number of notches to be entered by the beveled end of an arm 234 integral with the pull lever 235, the lever being provided at its outer end with a ring by which it may be conveniently manually manipulated.

Rigidly secured to the rear end of the platform (Figure 3) is an upright 236 carrying at its upper end a shelf 237 upon which there is a comb 238 between the teeth of which the print levers 218 pass and are guided.

On single revolution clutch shaft 128 there is mounted near the right-hand side of plate A a cam 239 with a high point 240. Adjacent the cam and pivoted at 241 on a stud secured in the side plate A is a lever 242 which carries a roller 243 held in engagement with the cam. At the upper end of the lever is a stud 244, which is of a length sufficient to extend over all twelve of the two-arm segments 209. The stud is flattened for a part of its length and has a round surface 245 which bears against the rear edges of all of the two-arm segments to reset them to neutral position. The stud also has a flange 246 in position to engage a tooth 247, one of which is carried by each print lever 218 to urge the forward ends of the levers slightly forward to slacken the engagement between their circular heads 217 and the openings 216 to facilitate the smooth lateral movement of the platform and insure that there is no obstruction presented to the free lateral movement of the circular heads in their openings. The four print levers 218 are arranged centrally of the group of twelve segments 209 and their portions extending from the comb support 251' are flexed in one direction or the other to connect with any of the twelve segments, the levers when so flexed (which is unnecessary in their central position) being held flexed and guided in the comb 238.

In selecting the proper columns of the card to be used for control purposes the hand lever 235 is manually pulled out by the operator, when the roller 249 on said lever will engage the lever 242 and through the medium of stud 244 will rock all of the segments forward to their neutral position and there will be carried with them all of the print levers 218. As intimated, the support is in the form of a comb between the teeth of which the levers slide and are guided. Each lever is provided with a tab 250 to each of which a spring 251 is attached whose other end is attached to the stationary support 251', the tendency being to urge all of the print levers rearwardly. The ratchet segments 209 are held in their set positions by the tension of the springs 251 which exert their influence to set the steps 212 against the ratchet teeth, which teeth are slightly undercut for the purpose of holding the position of the segment when its associated magnet is momentarily deenergized between records. After a print is taken the segments are reset and their movement in resetting overcomes the tension of the springs 251 permitting the individual comparatively weak springs 213' to withdraw the stops 212. Each lever is provided with a rearward extension 252 having an elongated slot 253 through which extends the rod 107, which is the same rod that the levers 104 are mounted upon. The lever extensions 252 are arranged to engage one or another of the steps 254 of the bars 255, these bars being like bars 153 with the exception that the high step of bar 153 is eliminated. When the bars 104 rest on the high step 155 of bars 153 the particular bar has not been actuated and consequently there is no print required for the particular accumulator wheel. However, in connection with bars 255, it is not contemplated to eliminate the printing at this point. Each of the bars 255 has an extension 256 to which springs 257 are attached to hold them normally elevated. The bail 161 which also operates upon the bars 153, operates upon bars 225 to hold them all down during tabulation, and to release them when printing is initiated.

Slightly separated from the large group of printing segments 172 (Fig. 2) is another group of four segments, this group being designated by the numeral 258. These segments may carry a greater number of type elements than the larger group and the number of steps on their associated bars will be increased accordingly, as shown in Fig. 3 where twelve steps are shown on bars 255 instead of ten, as shown on bars 153; otherwise the construction and operation of these bars and segments is like the construction and operation of the larger group. The bars 255 actuate the type segments for printing the numbers in the group-control field where the numbers run from "0" to "12," as shown in Figure 42. Accordingly, these bars are provided with twelve steps instead of ten.

As shown on the card illustrated in Figure 42, there are twelve columns in the group control field and in each column there are twelve vertical positions requiring twelve numerals corresponding to the twelve type elements on the printing segments 258. In the larger group of segments 172 there are ten numeral type elements or sufficient to take care of the columns of the remaining part of the card.

In the positions of the parts as shown in Figure 3, a printing operation has taken place and the printing mechanism has been reset, but the single revolution clutch on shaft 128 (Figure 31) has not completed its revolution, and immediately after the resetting of the printing mechanism the high point 240 on cam 239 engages roller 243 on lever 242, bringing all of the segments 209, racks 202, and sensing fingers 206 back to neutral position. When the high point of the cam 239 has passed the roller on the lever 242 the segments, racks and sensing fingers are moved rearwardly under the influence of springs 251, the first card of the next group, as intimated, being in position in the adjusting station, the rearwardly moving fingers will each find a punched hole and individually close the electric circuit for its associated magnet 214, which actuates its armature and projects its stop into the ratchet tooth on the segment 211 that corresponds with the hole that has been sensed by the sensing finger. In the meantime the print levers 218 have been moved rearward for a distance corresponding to the position of its associated segment, and the extensions 252 of the levers will usually be standing in different positions according to their relation to the sensing fingers, and in position to engage its appropriate step on the step readout bars 255 to set up on their segments a number dependent upon the position of the sensing finger. At this time the printing control mechanism is set up, but no printing takes place until after tabulation is completed on this group, when the bail 161 (Figure 3) releases these four bars simultaneously with all of the bars 153 for a complete printing operation indicating on the result sheet the area, etc., that the group belongs to.

When the first card of the second group enters the adjusting station, one or more of the sensing fingers 206 (Figure 3) fail to make contact, the control field arrangement having been changed from the control field arrangement of the preceding group. This will break the circuit between the sensing finger and its associated magnet, and a relay J illustrated in diagram (Figure 40) will establish an opposing circuit through coil 259b and will neutralize coil 259a which coil is normally energized of differentially wound magnet 259 (Figures 1 and 31), there being one of these magnets on each side of the machine on the outside of side plates A, and this action will cause, through means about to be described, the lifting of the cards in the stacker hopper out of the way of the knives of the feed drum 5. The neutralization of these differentially wound magnets is the first step in starting the mechanism to obtain the result from the tabulation of the previous group in the manner explained. The armature 260 of this magnet is pivoted at 261 to a stud in the side plate A, and terminates in an arm 262 which carries a lug 263 cooperating with the cam 264 on shaft 4 and formed with four arcuate ribs 265, the ends of which are separated to form four openings 266 for the entrance under the influence of spring 262' and the exit under the influence of magnets 259 of the lug 263. Forward of the armature-fulcrum 261 and on the armature is a stud 267 on which is pivoted a link 268, which in turn is pivoted at 269 to a short arm 270 mounted on a rockable shaft 271, which shaft is mounted in suitable bearings in the side plates A. This shaft is kerfed at appropriate points to receive the stack-lifting fingers 272 for lifting the stack out of the path of the feed knives. The armature carries a projection 273 which is adapted to extend between the beveled ends 274 of levers 275 when the differentially wound magnets 259 are neutralized. These levers are pivoted at their upper ends to studs 276 in the side plate A. The bell cranks 277 of the levers are secured to the extensions of the studs 15 upon which the upper feed rollers 8 are mounted (Figures 5 and 31). The cam portions of the lower feed rolls 9 and 10 are shown of exaggerated depth, but this will be about equivalent to the thickness of a record, or about .010 of an inch, and the lift of the upper feed rolls 8 will be very slight. To compensate for the difference in fulcrums of the bell-crank arms 277 and the fulcrum of the upper roller arms 16, an almost negligible freedom between the parts is necessary. This mechanism, as will appear from Figure 2, is duplicated on opposite sides of the machine to obviate the possibility of torsional strain and more perfectly balance the operations of the elements. On the stud 267 of the armature is pivoted the link 142 previously referred to in connection with the single revolution clutch shown in Figure 31.

The first card of the second group, we have seen, breaks the circuit of one or more of the four magnets J (Figure 3), thereby neutralizing the differentially wound magnet 259, releasing the armature 260 and, under the influence of spring 262', causing the projection 273 to extend between the lower ends of the levers 275, holding them apart, and consequently, since these levers are connected with the extensions of studs 15, the feed rollers 8 will be prevented from contacting with lower feed rollers and the card will remain in the adjusting station until the armature 260 is again attracted by the coil 259a of the differentially wound magnet 259. There is no camming action between the ends 274 of arms 275 and the projection 273 is merely for the purpose of holding the arms separated when the feed rolls are separated.

Immediately upon the armature 260 being released the link 142 will move down unlatching the one revolution clutch, initiating the print operation and simultaneously raising the fingers 272 for lifting the card stack to prevent further feeding of the cards during the printing operation.

The cam 264 is for the purpose among others of providing an adequate and positive force for lifting the card stack at the right moment, the spring 262' not being depended upon for this purpose. When the armature is released, the cam is so timed that one of the openings 266 will be presented to the lug 263 which will, under the influence of the spring 262', enter the opening and thereafter, for a time, remain on the under side of the arcuate ribs 265 or until the machine is conditioned to tabulate the second group of cards. Obviously, when the lug is under the ribs the stack lifting fingers will be positively held in raised position. At the completion of any tabulating operation and when there is no record to follow and a printing operation is desired, switch O' is closed, thereby neutralizing differentially wound magnets 259, allowing the one revolution clutch to function as heretofore explained.

*Card receiving and stacking mechanism*

Power is transmitted from large gear 2 through idler 278, gear 279, combined feed roll and gear 280, idler 281, combined feed roll and gear 282, idler 283, combined feed roll and gear 284, idler 285, combined feed roll and gear 286, idler 287, and combined feed roll and gear 288. Associated with the combined feed roll and gear 282 is a combined feed roll and gear 282' mounted on a pivoted lever 289 connected by a spring 290 to a similar lever 291 carrying a combined feed roll and gear 292. Below these are provided levers 293 and 294 connected by spring 295, each of these last mentioned levers carrying a combined feed roll and gear 296 and 296'. The rolls and gears 292, 296 and 296' cooperate with the similar rolls and gears 284, 286 and 288 to feed the card into the receiver. Gears and rolls similar to those just described are duplicated on the opposite side of the machine and mounted on the side plates B.

Between these gears and rollers a chute 297 is provided through which the cards pass and are guided from the sensing roll to the card receptacle. Leaving the feed rolls 288 and 296' (Figures 3 and 35) the card passes through an opening 298 in a table 226 to the revolving stacker 299 mounted on shaft 300 journaled in brackets 301 and 302 secured to the under side of the table.

The stacker is driven from the gear 288 through two idlers 303 and 304, the letter meshing with the gear 305 fast to shaft 300. As shown in Figure 35, these last-mentioned gears and idlers are mounted on a swinging bracket 306 on one side of the machine only, as shown in this figure.

Referring to Figure 36 particularly, the table 226 and the side plates A are shown in dot-and-dash lines, giving the outline of the table and plates to show the relative position of stacker mechanism that is below the table oblique to its side edges, this oblique arrangement being for the purpose of facilitating the withdrawal of the drawer without disturbing the operator's position at the front of the machine.

The drawer about to be described may, for the want of a better name, be called a skeleton drawer, in that it has not the usual sides, rear end or bottom that characterize an ordinary drawer, yet it is operated like a drawer.

The brackets 301 and 302 are extended below the shaft 300, and each is provided with a projection 307 upon which is supported a cross bar 308. The brackets are further extended to form journals for a shaft 309 fast to which and spaced on which are drums 310 around which are wound metallic ribbons 311 whose ends are attached to the drums.

Referring to Figure 36, the numeral 312 designates two flat bars arranged parallel to each other but oblique to the side plates. At the front end of the drawer the bars are attached to studs 313 secured to the under side of the table, and at their rear ends are attached to the cross bar 308, which bar extends substantially throughout the width of the machine. Between these bars 312 and in the same plane are two other bars 314 secured at their forward ends to the front plate 315 of the drawer, there being provided on the drawer a drawer-pull 316. Centrally located between these bars and parallel therewith is a rod 317 having therein a lengthwise groove 318 shown in dotted lines in Figures 35 and 36. The forward end of this rod is supported by and rocks in the drawer front 315, there being on the rod a wing knob 319 by which the rod may be rocked for a purpose that will presently appear. The numeral 320 designates a slidable bracket which is practically the same length as the card and to the center of which and integral therewith is a sleeve 321 through which the rod 317 passes and in which it is supported, it being understood that the bracket 320 integral with the sleeve extends laterally in both directions and rests and travels on the bars 312, aided by rollers 322 (Figure 35).

Pivoted to the sleeve 321 is a lever 323 having an elongated opening embracing the rod, there being at the end of the opening a tooth 324 arranged to grip the rod normally on its bottom and to enter the groove 318 in the side of the rod when the wing knob 319 is turned to release the tooth from the rod at such time when it is desired to open the drawer, there being a spring 325 tending to cause the tooth to normally grip the rod. When the rod 317 is turned by the knob 319 the groove 318 will be presented to the tooth 324 of lever 323 which now releases its grip upon the rod and permits it to move sufficiently to close the gap between the card stack 327 and flange 326 carried by the rod, when the drawer is pulled out, thus assuring that the cards are kept in proper upright position. The semicircular flange 326 engages the stack of cards 327 only when the drawer is pulled out, to prevent the cards from falling out of the order in which they have been stacked. The end of the rod is further provided with a plug 328 adapted to enter between the spring contact points 329 carried by a block 330 of insulating material, the arrangement being such that when the drawer is pulled out the motor circuit is broken and the machine is stopped. This is desirable when the drawer reaches its full capacity, or when it is desired by the operator to remove the drawer before such time, thut preventing the cards from being fed into the drawer when it is out of proper position to receive them.

The numeral 331 indicates a backing plate for the cards, which plate is firmly secured to the bracket 320 (Fig. 35), and between this plate and bracket are secured the ends of metallic ribbons 311. These ribbons form the base for the card stack, so that at no time in their travel are the cards moved relative to their base in such wise as to injure their edges as might interfere with their future use.

Obviously, as the stack builds up and is moved forward, a new part of the ribbon base is presented for each added card, which has been added by the stacker 299, the stacker having received the cards one by one in pockets 333, in position to be stacked. The stacker is so geared and timed that it will receive a card for each half revolution, and by reason of the eccentric formation of the parts of its arms that form the pockets, will successively stack the cards. A stationary circular casing 334 carried by bracket 302 contains a spiral spring, the outer end of which is fastened to the casing and the inner end secured to the shaft whereby a constant tension is put upon the ribbons and bracket 320 urging them rearwardly, thus keeping the arms of the stacker in contact with the card stack.

Means for conditioning sensing elements for different card runs

In machines of this type so far as I am aware, it is very difficult, and requires much time of an experienced mechanician, to change the machine for different runs in which the sensing means operates upon different columns in different fields of the card.

I propose to provide a simple means by which the operator can quickly and conveniently render inoperative the sensing means for any card column that is not to be sensed, thus obviating the difficulties and loss of time incident to the old methods.

In the card illustrated in Fig. 42, there are ten fields with various numbers of columns therein to be tabulated. For instance: the "size" field has three columns from 33 to 35; whereas the "number of hours" field has six columns, 45 to 50, etc. For a card like that shown in this figure, there will be an accumulator wheel for each column in each field whether the information in any column or columns is to be tabulated or not, the wheels that are appropriate to the columns not to be tabulated being used for accumulating or for the overflow of the capacity of that accumulator assembly.

In the present machine I contrive means for locking the tabulating sensing means release levers to make them inoperative so that their accumulator wheels may be used solely for overflow or accumulating purposes, as above intimated. In this card, on the right-hand end of "cost" field 54 to 59 there are six columns for each of which there is an accumulator wheel; and in the field adjoining, headed "No. of Ops.," meaning number of operations, there are three columns, for each of which there is also an accumulator wheel, making nine in all, the last three accumulator wheels being used solely for overflow accumulating purposes. By a successive arrangement of accumulator wheels throughout the length of the card, I am enabled to tabulate all of the information, say for instance on the card illustrated.

Referring particularly to Figures 4a and 4b, the numeral 335 designates a bar provided with holes 336, one of which holes is appropriate to each of the release levers 74. This bar is seated in a depression 337 in the deck 33", and extends from one side plate to the other. The bar at its rear edges is under-cut as indicated at 338. The under-cut portion, together with the angular wall 339, forms a long pocket for the reception of the conical heads 340 of pins 341 when used for disabling purposes. The pins, as clearly shown in Figure 4a, when it is desired to disable a releasing lever, extend under the shoulder 342 of the lever, and obviously prevent it from operating. Preferably, the bar is held in the recess by screws 343, one at each end and in convenient reach of the operator when it is desired to remove the bar or insert the pins, accordingly as the card run is changed. Preferably, this bar will be calibrated at its forward beveled edge so that the operator may see at a glance just where to insert the pins to coincide with card columns that are not to be tabulated. Obviously such arrangement is so simple that the operator can quickly make the change without the necessity of the services of a skilled mechanician.

Modified sensing means

Referring particularly to Figures 37, 38 and 39, it will be seen that the lever 74' is provided with a projection 351 arranged to engage the strap 352 to close contact with a similar strap 353 through contact points 354. These straps are mounted in a bar 355 of insulating material which bars extend throughout the width of the machine, there being a contact for each accumulator wheel. From the terminals of these straps suitable conductors lead to suitable electrically-controlled tabulating means to initiate the tabulating operations. It will be observed, particularly from Figure 37, that when the pin or sensing finger 63 of the sensing roll 53 enters a hole a in card K it will engage the front edge of the broadened end 77' of said lever and will continue in yielding contact with said lever and substantially for the entire extent of the upper edge of the lever, as will be obvious by reference to Figures 38 and 39. This manner of engagement between the pin and the lever prolongs the contact for a period much longer than has been possible with the usual sensing elements, through the usual round holes in the card. This prolonged electrical contact contributes greatly to the efficiency of the machine in that more time is allowed for electrical saturation of electrical elements such as magnets used for controlling tabulation or other like operations. So far as I am aware, in order to obtain long electrical contact, it has been regarded as necessary to elongate the hole punched in the record, which desired result, due to the character of the sensing element and the circuit-closing means shown, will be no longer necessary.

Group control circuit

In Figure 40 there are shown three circuits that control the differentially wound magnets 259. In the first circuit the coils 259a are energized when a suitable switch C' is thrown to start the machine. Through the second circuit magnets 214 and relays J are energized when the sensing fingers 206 find a hole in a card and therethrough make contact with the contact points 198. Through the third circuit coils 259b are energized when armatures M and contacts N are closed. The closing of this circuit by the said armatures and contacts neutralizes the differentially wound magnets 259.

*Circuit 1.*—Starting from source of current C, the current passes through switch C' and over wires D and E to coils 259a, back to source through resistance F.

*Circuit 2.*—Starting from source, the current passes along wires D and G to and through contacts 198 and card holes "3" "4" and "9" to the sensing fingers 206, through strips 205 and 207 to connecting posts 208, and from thence over wires H to and through magnets 214, and from said magnets over wires I to relays J and from said relays over wires I' to a common wire K' back to source of current.

*Circuit 3.*—Starting from source, the current passes over wires D, G and L and there being no hole for the sensing finger to make contact through at number "2" hole in the card, the current continues over L to armature M and contact N and from thence over wire N' to and over wire O to and through coils 259b through resistance F to source.

In Figure 40 the set-up is for the group numbers "2" "3" "4" "9,". Assuming that the card shown is the first card of a new group, there will be a disagreement in that the card is punched "1" "3" "4" "9" instead of "2" "3" "4" "9," and the sensing finger standing at "2" position will fail to make contact and will therefore close the third circuit and neutralize the differentially wound magnets 259. When this is done a printing operation is initiated, printing results of the previous group of cards tabulated in front of which results will be printed the group numbers "2" "3" "4" "9". Immediately after the printing operation, through the medium of the segment 210 and rack bar 202, all the sensing fingers 206 are brought forward by the action of the cam 239 (Figure 3) to normal or reset position, and then are allowed to move rearward to then select the holes "1" "3" "4" "9" punched in the card K. It will be noted that when the group numbered "1" "3" "4" "9" has been selected the cards will continue with this same group number until there is another disagreement in one or all the group control columns.

Referring to Figures 3 and 40, it is pointed out that all the contacts 198' in the 12th position are sufficiently elongated to provide a 13th position, permitting the sensing fingers 206 to make contact at this point when all of the segments 209 have been fully reset. At this time the 13th step 211' will be engaged by the stop 212 by reason of the energization of the magnets 214 when there is no card in the adjusting station. By this arrangement the machine is automatically conditioned for the first card of any group.

When cards are exhausted and there are no more cards in the machine to follow, and immediately after the printing operation, through the medium of the segments 211 and the rack bars 202, all the sensing fingers 206 are brought forward by the action of cam 239 (Figure 3) to normal reset position and then allowed to move rearward to then select the first elongated contact 198' which is the 12th and 13th contacts. On making contact the holding magnets will be energized and stops 212 will engage ratchet teeth 211' on ratchet tooth segments 211, this being the 13th position and occurs after a total taking cycle is completed and there are no more cards to follow.

In starting the machine, the operator places the stack of cards in the feed hopper 7 and closes the switch C' thereby energizing the motor 356 and coils 259a of the differentially wound magnet 259. Normally the sensing fingers 206 make contact with the elongated contacts 198' as a result of a previous total taking cycle. When all the sensing fingers are in reset position on contacts 198', all of the relays J will be energized, thus breaking the circuit to coil 259b of the differentially wound magnet 259. Occasionally when the motor switch C' has been opened after a period run, the mechanism may continue to coast for a fraction of a cycle and the lug 263 may enter one of the apertures 266 in the cam 264, thus initiating a total taking cycle, but as the print bars 255 are in the 13th position at this time, nothing will be printed on the result sheet because the printing segment is raised to a point where the push bar 171 will enter the lower cut-out portion of the print segment 258 and will not actuate said segments. Normally, the lug 263 follows the outer periphery of the arcuate ribs 265, while cards are being fed to the group control sensing station, but no total taking cycle will be effected when said lug is in such position.

When the first card leaves the feed hopper and before it reaches the stopped position in the group control station, the circuit to the holding magnet 214 is broken and relays J are deenergized, permitting contacts M and N to close, thereby energizing coil 259b and neutralizing magnet 259, but stops 212 on armature 213 will not be removed from the ratchet teeth of segments 211 due to the under-cut of said teeth. This is because the springs 251 are stronger than the springs 232 and will substantially neutralize the pull of said springs 232. The only time springs 232 will remove these stops from the teeth of the segments is during a total taking cycle, at which time the pressure on the stops 212 will be relieved by the resetting movement of the segments 211, effecting a cam action on the stops and thus permitting the relatively weak springs to remove them. When the card has reached the stopped position of the sensing station there will be a disagreement in the group field and the current will flow through coils 259b, energizing said coils and neutralizing the differentially wound magnets 259. At this moment the lug 263 will enter one of the apertures 266 in the cam 264 and a total taking cycle will be initiated and the sensing fingers 206 will still be on contact 198'. When the fingers are in this position no print will be made on the result sheet. While the print bars 255 and levers 218 are being reset, the sensing fingers 206 will move forwardly a short distance beyond contacts 198', thereby permitting stops 212 to be removed from the ratchet teeth 211' described as being in the 13th position. As the sensing fingers 206 move rearwardly to detect holes in the card, which when detected cause holding magnets 214 to be energized, the stops 212 will engage the ratchet teeth corresponding to the holes the fingers have sensed. When the first card is leaving the group control station and a second card is about to enter, it will again break the circuit to the holding magnets 214, but no total taking cycle will occur, as previously explained. However, if the second card after it has reached the stopped position in the sensing station, has new group control perforations, a total taking cycle will occur and print the result of the previous card. During said cycle the cards in the feed hopper will remain out of engagement with the feed knives and the first card will have actuated the no-card lever 98 (Figure 18a), depressing the same and allowing entries to be made on the accumulator wheels. After the total taking cycle there will appear on the result sheet the first group number and other information taken from said first card. The first and succeeding cards of the second group having been sensed, will pass on, depressing the no-card lever as before, holding it depressed until the last card of this particular group has passed. When the cards have been exhausted and the last card has passed over the no-card lever 98, said lever functions to latch the accumulator arms 81 and no entries will be made on the wheels. The machine will continue to idle until the operator closes switch O', and when this is done a total taking cycle is initiated, printing the last group number and other information on the result sheet and simultaneously restoring the sensing fingers 206 to the 13th position on the elongated contact 198'. The machine will continue to idle until the motor switch has been opened, thereby stopping the machine. While the machine was in operation and before the first card reached the sensing roll 53 (Figure 18), no entries were made on the accumulator wheels because the no-card lever 98 was in the latched position, or position shown in said Figure 18.

Gears 2 and 3 have a ratio of one-to-one, and one revolution of these gears represents four card feed cycles, there being four feed knives on the feed drum quarterly arranged thereon. The ratio between the gears 2 and 136 is two-to-one; thus one revolution of the gear 136 with its carried parts represents two card feed cycles. During a certain part of the revolution of the gear 136 the machine is conditioned for and takes a print of the result of the tabulation of the previous group, and then during that same certain portion of the revolution the printing mechanism is reset and the accumulator wheels are also reset. After this the cam 239 (Figure 3) on the shaft 128 comes into action to reset the sensing fingers 206 through the segments 211, and to release said fingers to allow them to go rearward to sense any card that may be in the sensing station. The disagreement in the group control that initiated this printing operation still continues until the sensing fingers come rearward to establish a new control for the new group. Until the new control is established the lug 263 will remain on the inner periphery of the arcuate ribs 265, but when such new control is established the differentially wound magnet 259 will attract armature 260 as the result of deenergizing the winding 259b upon energizing all the relay magnets J, and consequently the lug 263 will pass through the first available opening 266 and thereafter the lug will ride on the outer periphery of the ribs until there is another disagreement in the group control in the sensing station.

*Over capacity control of accumulator assembly*

In a machine of this type where a general or complete assembly of accumulators may be split or divided into smaller accumulator groups, there may be some accumulator groups not able to carry the desired total and overrun their capacity, thereby giving an incorrect record of the result. To prevent this, I provide a control for indicating to the operator when any accumulator assembly is near to full capacity. This control rings a bell, flashes a light and also initiates, automatically, the printing of a partial total reading that is indicated on the result sheet as a partial total reading.

To obtain maximum flexibility each of the accumulator wheels are equipped with means to close a circuit, as shown in Fig. 4. A plug board is arranged to select any of the accumulator wheels as the last controlling wheels in the selected accumulator assemblies, as shown in a conventional wiring diagram, Fig. 41.

Referring now to Figure 4, the numeral 363 is a hanger suitably secured to the deck portion 33, extending across the machine and which forms a support for a plurality of strap contacts 364, there being a contact for each step readout member 85. One of the straps of each contact has secured to it, at its lower end, a strip of insulating material 365 engaged by the tens carry cams 102 of the step readout member 85 when in the ninth position to close a circuit through certain contacts to insure a supplementary reading, thus automatically preventing any particular group of accumulators from overrunning their capacity.

In Figure 40 I have shown an over-capacity control circuit which is in series with coil 259b of the differentially wound magnet 259. It will be noted from Figure 41 that the card column contacts "24," "25" and "26" are the over-capacity contacts for card columns "27" to "32" (Figure 42), that is to say, when the locking pins 341 are inserted by the operator to disable certain card columns 24, 25 and 26, in this instance "Mat" meaning material, the actuating means are in inoperative position allowing the three overflow accumulator wheels in card columns "24," "25" and "26" to be added to "Amount" accumulator assembly in card columns "27" to "32" thereby increasing the capacity of the "Amount" accumulator assembly to 999,000,000, which is near the total capacity of the "Amount" accumulator assembly, and at which time the three contact strips 364, corresponding to the three nines in the "Amount" just stated, will be closed. When these contacts are closed a partial total will be printed and the machine cleared and ready for the remaining cards of the group.

Referring to Figures 40 and 41, and starting from source of current through motor-starting switch C', current passes over conductor D, over conductor E to connecting post E', over conductor P to metallic connecting strip Q mounted on plug-board Q', which board is of insulating material and is indicated by dotted lines in Figure 41. Leading from jack R in the strip Q to jack T in the plug-board is a suitable plug connection S. This connection leads to the contacts 364 for card column "24" which, as shown, is connected in series with contacts 364 for card columns "25" and "26," as shown in the diagram, Figure 41. These contacts are closed by the appropriate step readout cams 85 completing this circuit through jack U over suitable plug connection, to metallic strip V. This established connection indicates that the accumulator assembly for the "Amount" group (Figure 42) is approaching its capacity. The current now passes from strip V over conductor W to contacts X, which are now closed, having been closed by cam X' mounted on shaft 128. Current now passes over conductors to bell Y and light Z, and from thence through suitable binding post E'' to conductor O (Figure 40) to lower winding 259b of differentially wound magnet 259, thereby neutralizing the upper winding of said magnet independently of the group control circuit to initiate a printing operation to effect a supplemental total reading.

Cam X' is mounted on single revolution clutch shaft 128, which shaft is normally at rest and only revolves during a printing operation. This cam is for the purpose of breaking the capacity control circuit by opening the contacts X when a printing operation is initiated, and prevents the contacts from closing before the accumulator assemblies are reset to zero position and when so reset this cam again closes the contact.

Referring to Figure 42, a conventional card is shown having 59 columns divided in several groups such as "State," "Div.," "Item," "Total cost," "Material," "Amount," "Size," "Cost," "Kind of labor," "Number of hours," "No. of ops." (meaning number of operations) and "Cost." In the set-up as shown in Figures 40 and 41, the card is punched "9," "4," "3," "2" under "State" for the group control circuit, while "Total cost" in card columns "18" to "23" has additional accumulator wheels from "9" to "17." Under "Amt." in card columns "27" to "32" there are provided three additional accumulator wheels "24" to "26," and under "Cost" six accumulator wheels "36" to "41," with three additional accumulator wheels "33" to "35," "Number of hours," "45" to "50," three additional accumulator wheels "42" to "44," and "Cost" six accumulator wheels "54" to "59" and three additional accumulator wheels "51" to "53."

It is pointed out that when "Total cost," "Amount," "Cost," "Number of hours" and "Cost" have exceeded their capacity, a bell will ring and a light will appear informing the operator that a supplemental print is about to take place.

When this supplemental print is taken the group control designation number in this case "9," "4," "3," "2" will be printed along with the result from the accumulator assemblies so that with every print the group will be identified. After each print the accumulators are reset to zero and when the remainder of the group is tabulated and printed, the same group number will appear upon the result sheet to identify this last reading as part of the previous reading.

I am aware that it is customary, in adding machines, to employ some identifying mark, as a star, etc., to indicate that the total is a partial total, and it will be understood that I may add a printing element for this purpose, but I prefer to employ the method disclosed wherein the group control number is duplicated on the result sheet when the total is taken, thus showing not merely that the reading is a partial total reading, but also an additional reading of that same group. Obviously, the use of a star or other such mark or symbol does not tie the reading up with anything in particular, but shows only that the reading is a partial total.

I claim:

1. In a perforated record-controlled tabulating machine, in combination, sensing means including a rotatable roll, sensing elements radially and slidably arranged in said roll, said sensing elements operating through holes in the record during a movement of the record, and inflatable means within the roll and operating simultaneously upon all of the sensing elements to hold them in sensing position, said inflatable means being common to all of the sensing elements whereby when said inflatable means is inflated, a uniform force is applied to each of the sensing elements.

2. In a perforated record-controlled machine, in combination, a rotatable body, a plurality of sensing fingers radially and slidably mounted in said body, said fingers extending a substantial distance beyond the periphery of said body and operating continuously through perforations in a record, at a point substantially before the finger passes the point of tangency of the rotatable body and record, and to a point substantially after the finger passes said point of tangency, a pair of electrical contacts, means operated upon by said fingers through the perforations in the record to close said pair of electrical contacts, said means including a contact operating element having a control surface adjacent said fingers, said surface being not less in extent than the distance between the points where contact is first made between the sensing fingers and said surface, and where said fingers leave said surface.

3. In a perforated record card-controlled tabulating machine, in combination, tabulating sensing means, card adjusting mechanism in advance of said sensing means to adjust a card relative to the sensing means before it reaches said sensing means, card feeding means for feeding cards first to the card adjusting mechanism and then to the sensing means, and means for rendering said feeding means ineffective when a card reaches the adjusting mechanism to stop it in adjusting position, the card adjusting mechanism including means for engaging a card and yieldingly holding it in adjusting position upon its release from the card feeding means, said adjusting mechanism also including movable means for simultaneously engaging all of the edges of a card when said card is in adjusting position to adjust it in four directions to insure true registration of the perforations therein with the sensing means.

4. A machine of the character set forth in claim 3, wherein the means for engaging and yieldingly holding the cards in adjusting position comprise a member overlying the card and springs for holding said member yieldingly in contact with the cards.

5. In a perforated record-controlled machine, sensing means operating through perforations in a record, tripping levers moved by the sensing means through said perforations, a removable bar in proximity to said levers and carrying removable stops which when inserted in the bar project into the path of movement of said levers to engage and lock them in inoperative position.

6. In a machine controlled by perforated records arranged in groups, a plurality of stationary sensing contacts, a plurality of movable sensing fingers, one for each column in the group number field, means for moving said fingers across said stationary contacts in the direction of the record columns to make contact with said stationary contacts through perforations in a record between said contacts and fingers, means for feeding records between said contacts and fingers and momentarily stopping the records in registry therewith, means controlled by said fingers and contacts for stopping and thereafter latching the movable sensing fingers in a position determined by perforations in the first record of a group, devices controlled by said contacts and latched sensing fingers for determining whether succeeding records of a group agree with said first record, and means controlled thereby upon disagreement in any succeeding record for controlling the operation of the machine.

7. In a machine controlled by perforated records arranged in groups, a plurality of stationary contacts, a plurality of movable sensing fingers, one for each column in the group number field, means for moving said sensing fingers across said stationary contacts in the direction of the record columns to make contact with said contacts through perforations in a record between said contacts and fingers, means for feeding the records between said contacts and fingers and momentarily stopping said records in registry therewith, means controlled by said fingers and contacts for stopping and thereafter latching the movable sensing fingers in a position determined by perforations in the first record of a group, mechanism including differentially wound magnets controlled by said contacts and latched sensing fingers for determining whether the succeeding records of a group agree with said first record, and means controlled thereby upon disagreement in any succeeding record for controlling the operation of the machine.

8. In a tabulating machine controlled by perforated records arranged in groups, a plurality of stationary sensing contacts, one for each column in the group number field, a plurality of movable sensing fingers, means for moving said fingers across said stationary contacts in the direction of the record columns to make contact with said contacts through perforations in a record between said contacts and fingers, means for feeding the records between said contacts and fingers, and momentarily stopping said records in registry therewith, means controlled by said fingers and contacts for stopping and thereafter latching the movable sensing fingers in a position determined by the perforations in the first record of a group, mechanism including differentially wound magnets and suitable relays controlling said magnets, said magnets and relays controlled by said contacts and latched sensing fingers, for determining whether the succeeding records of a group agrees with said first record, and means controlled thereby upon disagreement of any succeeding record for controlling the operation of the machine.

9. In a tabulating machine controlled by perforated records arranged in groups, a plurality of stationary sensing contacts, a plurality of movable sensing fingers, one for each column in the group number field, means for moving said sensing fingers across said stationary contacts in the direction of the record columns to make contact with said contacts through perforations in the record between said contacts and fingers, means for feeding the records between said contacts and fingers and momentarily stopping said records in registry therewith, means controlled by said fingers and contacts for stopping and thereafter latching the movable sensing fingers in a position determined by the perforations in the first record of a group, means controlled by said contacts and latched sensing fingers for detecting disagreement in any succeeding record of a group, magnets controlled by the last-mentioned means upon disagreement, a timing device comprising a rotary cam and devices cooperating with the cam and controlled by said magnets for interrupting the feeding of a succeeding record upon such disagreement.

10. In a machine of the character described controlled by perforated records arranged in groups, in combination, group control mechanism including stationary electrical contacts corresponding to the perforation positions in the record columns selected for control, movable sensing fingers, one for each of said columns, arranged in passing over the record to make contact with said stationary contacts through the perforations in the record, means for feeding the records between said contacts and fingers, yielding means for moving said fingers in the direction of the record columns to position to make contact, means under control of said contacts and fingers for stopping and thereafter latching the fingers in a position determined by the first record of a group, devices controlled by said contact and latched sensing fingers for detecting whether succeeding records of a group agree with said first record, and means controlled thereby upon disagreement of any succeeding record for disabling said feeding means when a record is in registry with said stationary contacts and causing operation of said moving means to move said fingers to a new position determined by the record that caused the disagreement.

11. In a machine controlled by perforated records arranged in groups, a plurality of stationary electrical contacts, a plurality of movable sensing fingers, one for each column in the group number field, means for moving said sensing fingers across said stationary contacts in the direction of the record columns to make contact with said contacts through perforations in the records between said contacts and fingers, means for feeding the records between said contacts and fingers and momentarily stopping said records in registry therewith, means controlled by said fingers and contacts for stopping and thereafter latching the movable sensing fingers in positions determined by the perforations in the first record of a group, printing mechanism, means under the control of said sensing fingers for positioning said printing mechanism to print group numbers as represented by said latched sensing fingers, means for operating said printing mechanism including a single revolution clutch, and means controlled by said contacts and latched sensing fingers for causing the operation of said clutch when a succeeding record disagrees with said first record.

12. In a tabulating machine controlled by perforated records arranged in groups, group control mechanism including electrical contacts corresponding to the perforations in the control field of the record, movable sensing fingers, one for each column in the group number field and arranged in passing over the record to make contact with said contacts through perforations in the record, means for feeding the records between said contacts and fingers, means for moving said fingers across the contacts in the direction of the record columns, to position to make contact, means under control of said contacts and sensing fingers for stopping and thereafter latching said fingers when contact is established, printing mechanism for printing the group numbers including movable type elements, means actuated by the finger moving means to position the type elements for printing appropriate group numbers according to the position in which the sensing fingers are latched, means for actuating the type elements to effect a printing operation, means controlled by said contacts and latched sensing fingers for determining whether succeeding records agree with the setting of the latched sensing fingers, and means controlled thereby upon disagreement of a succeeding record for causing operation of said actuating means.

13. In a perforated record-controlled tabulating machine, in combination, a plurality of printing sectors rockably mounted above the path of travel of the records and upon a floating pivot whereby said sectors may be moved bodily in a lateral direction to effect printing, means for moving said sectors to effect printing, a plurality of stepped readout bars whose upper ends terminate below the path of travel of the records to permit the records to move between said sectors and bars, and a pendant pivoted to each sector for engagement by the readout bars to move the sectors to position preparatory to printing when the readout bars are advanced across said path of travel.

14. In a perforated record-controlled tabulating machine, in combination, stationary electrical contacts corresponding to the perforations in the record columns selected for control, a plurality of movable sensing fingers, one for each column in the group number field and arranged to make electrical contact with said stationary contacts through perforations in a record, means for feeding the records between said contacts and fingers, a plurality of finger moving members, one for each finger and in engagement therewith, a plurality of spring actuated members for moving said finger moving members to cause movement of said fingers in the direction of the record columns, said spring actuated members being less in number than said finger moving members and detachably connected therewith a movable carriage for guiding said spring actuated members and permitting their displacement to engage any group of adjacent finger moving members, electrical means carried by said carriage and under the control of the stationary contacts and sensing fingers to arrest the movement of said finger moving members when the group sensing fingers make contact with the stationary contacts through perforations in a record.

15. In a perforated record controlled tabulating machine, in combination, group control mechanism including a plurality of stationary electrical contacts corresponding to the columns selected for control, a plurality of sensing fingers movable over the record in the direction of the record columns while said record is stationary, to make contact with said contacts through perforations in the record, means for feeding the records between said contacts and fingers, means for advancing the sensing fingers over the record, means under the control of said contacts and fingers for arresting and latching the fingers when perforations in a record are sensed, printing mechanism for printing the group designations selected by the sensing fingers, including stepped readout bars and rockable printing sectors actuated by said bars, means actuated by the finger advancing means for controlling the movement of said stepped readout bars to bring the printing sectors to position to print according to the selected position of said sensing fingers, devices for actuating the sectors of printing mechanism to effect printing, and means controlled by said contact and latched sensing fingers for determining whether succeeding records agree with the setting of the latched sensing fingers, and means controlled thereby upon detection of disagreement for initiating operation of said actuating devices.

16. In a machine of the character described, a printing mechanism control including a stepped readout bar and a printing element positioned thereby, means for releasing and means for advancing the bar, a readout lever, a two-point stop for said lever, one end of said lever being positioned to be engaged by the steps of said stepped bar to control the advancement of said bar and the other to engage the two-point stop, means for holding the lever against the stop, a stud carried by said lever, a rotatable toothed accumulator wheel cooperating with said stud to shift said lever from the high point of the stop to the low point upon the initial movement of the wheel, said wheel having a stepped readout portion and means for releasing the lever if it has been moved by the initial movement of the toothed wheel to the lower stop point to permit it to engage said stepped portion and thereby control the advancement of the stepped readout bar, the lever remaining on the high point of the stop to prevent any advancement of said readout bar and thereby suppress unnecessary zero printing if it has not been released from the high point by the initial movement of said wheel.

17. In a machine of the character described, in combination, an accumulator having a plurality of accumulator wheels and devices for actuating them, certain of the higher order wheels serving as over-capacity wheels, means for selectively disabling certain of the said actuating devices to permit the related accumulator wheels to serve for over-capacity control, a pair of contacts for each wheel, means on the accumulator wheels for closing said contacts upon the movement of said wheels from "8" to "9," a plugboard having a suitable plug connection to selectively connect the contacts related to the wheels serving for over-capacity control in a series circuit, printing mechanism and means for positioning said printing mechanism under control of said accumulator wheels, mechanism for operating said printing mechanism and positioning means to effect printing of the amount on said accumulator wheels, and means under control of said series for initiating operation of said mechanism when said circuit is closed upon movement of all of the selected over-capacity wheels to "9" position.

18. In a machine of the character set forth in claim 17, signalling means included in the series circuit to inform the operator that the printing operation initiated by the closure of said series circuit is due to the movement of said over-capacity wheels to "9" position.

OLUF L. CLEVEN.